US012615392B2

(12) United States Patent
Sun et al.

(10) Patent No.: US 12,615,392 B2
(45) Date of Patent: Apr. 28, 2026

(54) MULTIVIEW 3D IMAGE ENCODING METHOD, APPARATUS, SYSTEM AND STORAGE MEDIUM

(71) Applicant: SOUTHERN UNIVERSITY OF SCIENCE AND TECHNOLOGY, Shenzhen (CN)

(72) Inventors: Xiaowei Sun, Shenzhen (CN); Philip Anthony Surman, Shenzhen (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 276 days.

(21) Appl. No.: 18/691,407

(22) PCT Filed: Mar. 30, 2022

(86) PCT No.: PCT/CN2022/084022
§ 371 (c)(1),
(2) Date: Mar. 12, 2024

(87) PCT Pub. No.: WO2023/137869
PCT Pub. Date: Jul. 27, 2023

(65) Prior Publication Data
US 2024/0406441 A1     Dec. 5, 2024

(30) Foreign Application Priority Data

Jan. 21, 2022    (CN) .......................... 202210069609.9

(51) Int. Cl.
*H04N 19/597*        (2014.01)
*H04N 13/161*        (2018.01)
(Continued)

(52) U.S. Cl.
CPC ......... *H04N 19/597* (2014.11); *H04N 13/161* (2018.05); *H04N 13/282* (2018.05); *H04N 19/176* (2014.11); *H04N 2013/0081* (2013.01)

(58) Field of Classification Search
CPC .. H04N 19/597; H04N 13/161; H04N 13/282; H04N 19/176; H04N 2013/0081;
(Continued)

(56) References Cited

U.S. PATENT DOCUMENTS

2013/0293675 A1   11/2013  Iwasaki
2014/0294061 A1*  10/2014  Zhang .................. H04N 19/197
                                                                  375/240.02
2015/0271527 A1    9/2015  Sugimoto et al.

FOREIGN PATENT DOCUMENTS

CN        102326391 A    1/2012
CN        107407859 A    11/2017
(Continued)

OTHER PUBLICATIONS

International Search Report and Written Opinion of the International Searching Authority issued by the China National Intellectual Property Administration for International Patent Application No. PCT/CN2022/084022, mailed on Sep. 23, 2022 (English translation only).

(Continued)

*Primary Examiner* — Siamak Harandi
(74) *Attorney, Agent, or Firm* — Myers Wolin, LLC

(57) ABSTRACT

A multiview 3D image encoding method, apparatus, system and storage medium are provided. The encoding method may include the steps of acquiring image data, and obtaining depth information containing a depth value of each pixel in an image based on the image data; grouping the image data
(Continued)

Step S100: Acquire image data of an image, and obtain depth information containing a depth value of each pixel in the image based on the image data Step S200: Group the image data into blocks, and calculate a perceived angular resolution of each object in blocks based on the depth information of each object in blocks respectively, wherein the perceived angular resolution of an object in blocks is a required maximum angular resolution that enables identification of the object in blocks Step S300: Configure a respective encoding parameter for each object in blocks based on the perceived angular resolution of a respective one object in blocks, wherein the encoding parameter is configured such that a requirement of respective encoding parameter for a respective object in blocks with a respective perceived angular resolution into blocks, and calculating a perceived angular resolution of each object in blocks based on the depth information of each object in blocks respectively, where the perceived angular resolution of an object in blocks is a required maximum angular resolution that enables identification of the object in blocks; and configuring a respective encoding parameter for each object in blocks based on the perceived angular resolution of a respective one object in blocks, where the encoding parameter is configured such that a requirement of respective encoding parameter for a respective object in blocks with a respective perceived angular resolution is met.

19 Claims, 19 Drawing Sheets

(51) Int. Cl.
| | | |
|---|---|---|
| *H04N 13/282* | (2018.01) | |
| *H04N 19/176* | (2014.01) | |
| *H04N 13/00* | (2018.01) | |

(58) Field of Classification Search
CPC .. H04N 13/128; H04N 13/271; H04N 13/349; H04N 19/17; H04N 19/20; H04N 19/146; H04N 19/42
See application file for complete search history.

(56) References Cited

FOREIGN PATENT DOCUMENTS

| | | | |
|---|---|---|---|
| JP | 2013-30898 | A | 2/2013 |
| JP | 2013-128260 | A | 6/2013 |
| WO | 2011/158562 | A1 | 12/2011 |
| WO | 2022/002181 | A1 | 1/2022 |

OTHER PUBLICATIONS

First Search Report issued by the China National Intellectual Property Administration for Chinese Patent Application No. 202210069609.9, dated Sep. 14, 2022, with an English translation.
Supplementary Search Report issued by the China National Intellectual Property Administration for Chinese Patent Application No. 202210069609.9, dated Feb. 14, 2023, with an English translation.

* cited by examiner

200:System
210:Encoding Apparatus
211:Capturing Device
212:Multiplexing Device
213:Frame Buffer Device
214:Depth Map
220:Transmitting Apparatus 230:Receiving Apparatus
231:Display Device Driver
232:Demultiplexing Device
233:Frame Buffer Device
234:Display Device
235:Display Panel and Driver Step S100: Acquire image data of an image, and obtain depth information containing a depth value of each pixel in the image based on the image data Step S200: Group the image data into blocks, and calculate a perceived angular resolution of each object in blocks based on the depth information of each object in blocks respectively, wherein the perceived angular resolution of an object in blocks is a required maximum angular resolution that enables identification of the object in blocks Step S300: Configure a respective encoding parameter for each object in blocks based on the perceived angular resolution of a respective one object in blocks, wherein the encoding parameter is configured such that a requirement of respective encoding parameter for a respective object in blocks with a respective perceived angular resolution

FIG. 5

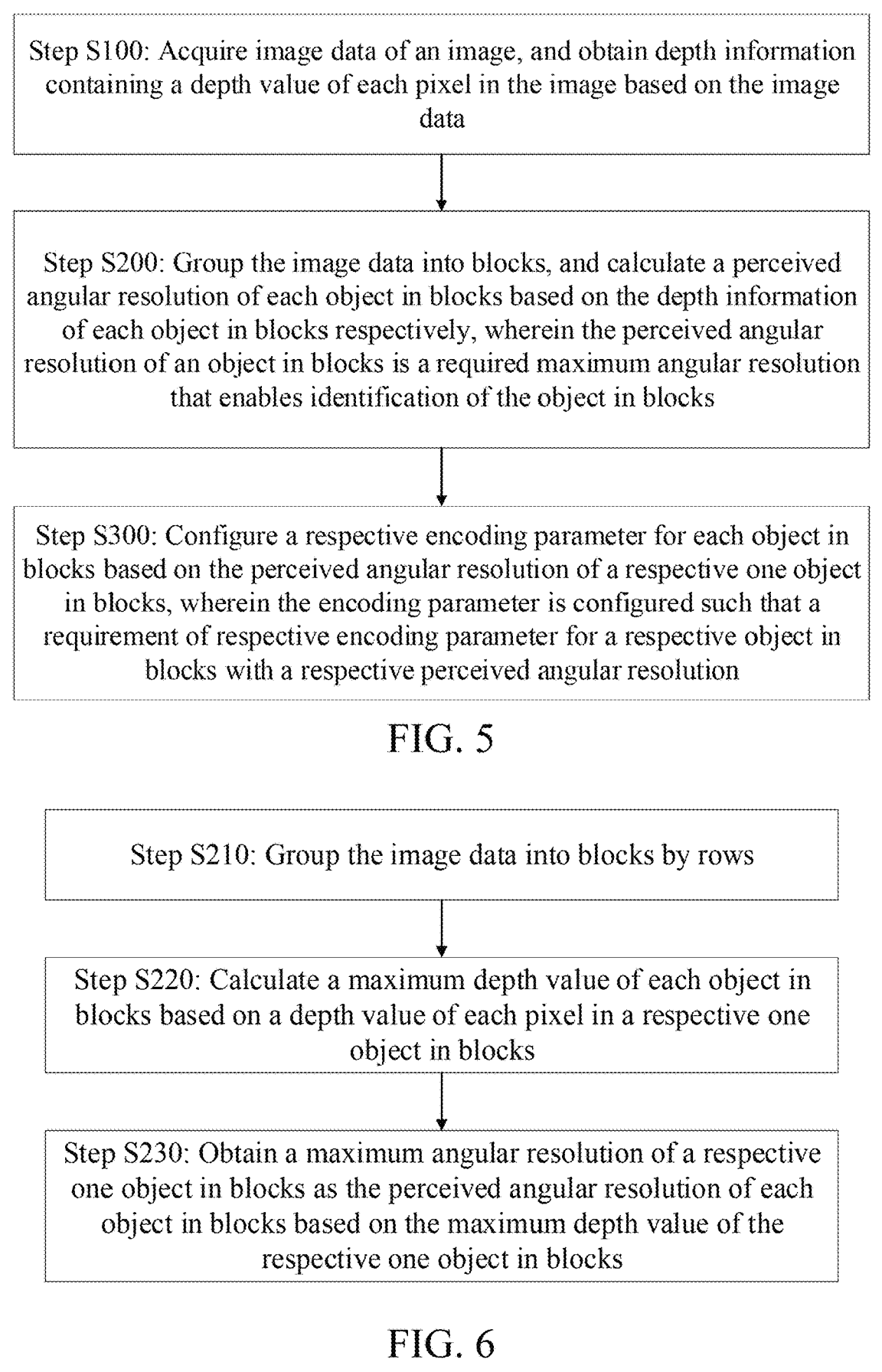

Step S210: Group the image data into blocks by rows

Step S220: Calculate a maximum depth value of each object in blocks based on a depth value of each pixel in a respective one object in blocks Step S230: Obtain a maximum angular resolution of a respective one object in blocks as the perceived angular resolution of each object in blocks based on the maximum depth value of the respective one object in blocks

FIG. 6

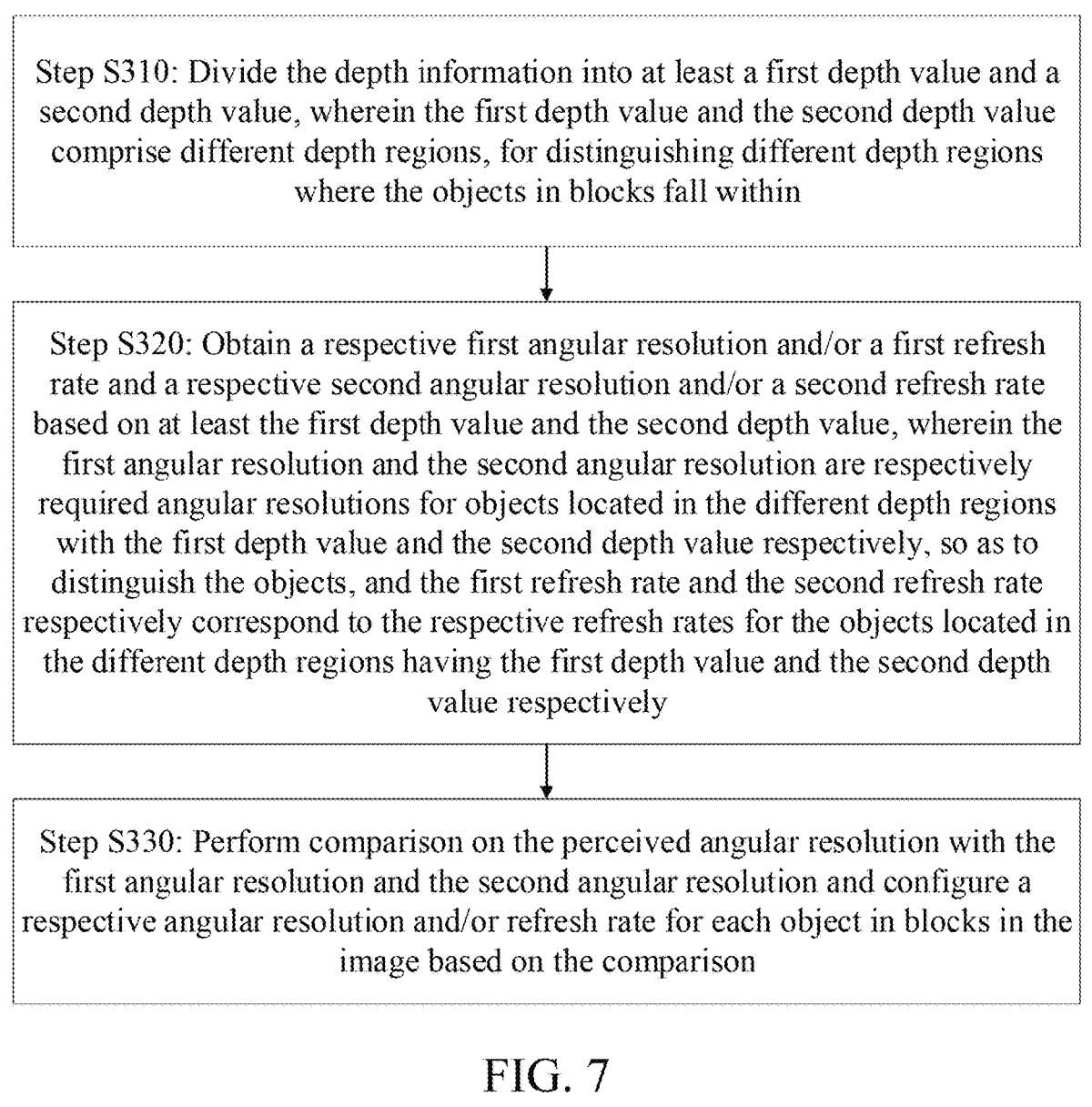

Step S310: Divide the depth information into at least a first depth value and a second depth value, wherein the first depth value and the second depth value comprise different depth regions, for distinguishing different depth regions where the objects in blocks fall within Step S320: Obtain a respective first angular resolution and/or a first refresh rate and a respective second angular resolution and/or a second refresh rate based on at least the first depth value and the second depth value, wherein the first angular resolution and the second angular resolution are respectively required angular resolutions for objects located in the different depth regions with the first depth value and the second depth value respectively, so as to distinguish the objects, and the first refresh rate and the second refresh rate respectively correspond to the respective refresh rates for the objects located in the different depth regions having the first depth value and the second depth value respectively Step S330: Perform comparison on the perceived angular resolution with the first angular resolution and the second angular resolution and configure a respective angular resolution and/or refresh rate for each object in blocks in the image based on the comparison

FIG. 7

Pixel group number

| View number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 to 4 | 1 | 1 | 1 | 1 | 2 | 2 | 2 | 2 | 2 | 2 | 2 | 2 | 2 | 2 | 4 | 4 | 4 | 4 | 4 | 4 | 4 | 4 | 4 | 4 | 4 | 4 | 4 | 1 | 1 | 2 | 2 | 2 |
| 5 to 8 | 1 | 1 | 1 | 1 | 2 | 2 | 2 | 2 | 2 | 2 | 2 | 2 | 4 | 4 | 4 | 4 | 4 | 4 | 4 | 4 | 4 | 4 | 4 | 4 | 1 | 1 | 1 | 1 | 2 | 2 | 2 | 2 |
| 9 to 12 | 1 | 1 | 1 | 2 | 2 | 2 | 2 | 2 | 2 | 4 | 4 | 4 | 4 | 4 | 4 | 4 | 4 | 4 | 4 | 4 | 4 | 4 | 1 | 1 | 1 | 1 | 1 | 1 | 2 | 2 | 2 | 2 |
| 13 to 16 | 1 | 1 | 2 | 2 | 2 | 2 | 2 | 4 | 4 | 4 | 4 | 4 | 4 | 4 | 4 | 4 | 4 | 4 | 4 | 1 | 1 | 1 | 1 | 1 | 1 | 1 | 1 | 1 | 2 | 2 | 2 | 2 |

FIG. 10a

Pixel group number

| View number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 to 4 | 1 | 1 | 1 | 1 | 1 | 1 | 1 | 1 | 1 | 1 | 1 | 1 | 1 | 1 | 1 | 1 | 4 | 4 | 4 | 4 | 1 | 1 | 1 | 1 | 1 | 1 | 1 | 2 | 2 | 2 | 2 | 2 |
| 5 to 8 | 1 | 1 | 1 | 1 | 1 | 1 | 1 | 1 | 1 | 1 | 1 | 1 | 1 | 1 | 4 | 4 | 4 | 4 | 4 | 1 | 1 | 1 | 1 | 1 | 1 | 1 | 1 | 1 | 2 | 2 | 2 | 2 |
| 9 to 12 | 1 | 1 | 1 | 1 | 1 | 1 | 1 | 1 | 1 | 1 | 1 | 1 | 4 | 4 | 4 | 4 | 4 | 1 | 1 | 1 | 1 | 1 | 1 | 1 | 1 | 1 | 1 | 1 | 2 | 2 | 2 | 2 |
| 13 to 16 | 1 | 1 | 1 | 1 | 1 | 1 | 1 | 1 | 1 | 1 | 4 | 4 | 4 | 4 | 4 | 4 | 1 | 1 | 1 | 1 | 1 | 1 | 1 | 1 | 1 | 1 | 1 | 1 | 2 | 2 | 2 | 2 |

FIG. 10b

Low Resolution

Medium Resolution

High Resolution

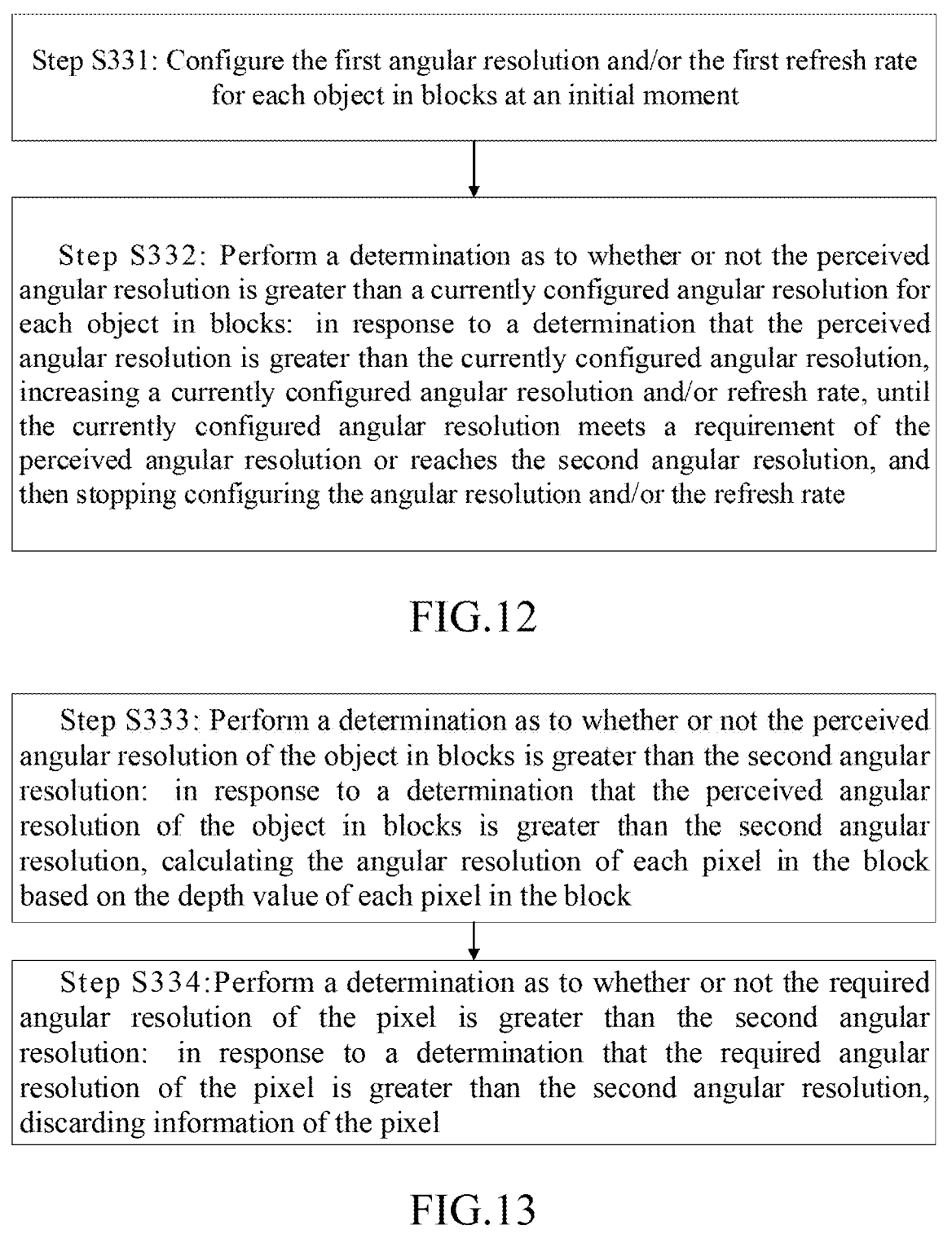

Step S331: Configure the first angular resolution and/or the first refresh rate for each object in blocks at an initial moment Step S332: Perform a determination as to whether or not the perceived angular resolution is greater than a currently configured angular resolution for each object in blocks: in response to a determination that the perceived angular resolution is greater than the currently configured angular resolution, increasing a currently configured angular resolution and/or refresh rate, until the currently configured angular resolution meets a requirement of the perceived angular resolution or reaches the second angular resolution, and then stopping configuring the angular resolution and/or the refresh rate

FIG.12

Step S333: Perform a determination as to whether or not the perceived angular resolution of the object in blocks is greater than the second angular resolution: in response to a determination that the perceived angular resolution of the object in blocks is greater than the second angular resolution, calculating the angular resolution of each pixel in the block based on the depth value of each pixel in the block Step S334:Perform a determination as to whether or not the required angular resolution of the pixel is greater than the second angular resolution: in response to a determination that the required angular resolution of the pixel is greater than the second angular resolution, discarding information of the pixel

FIG.13

200:System
210:Encoding Apparatus
211:Capturing Device
212:Multiplexing Device
213:Frame Buffer Device
214:Depth Map
220:Transmitting Apparatus 230:Receiving Apparatus
231:Display Device Driver
232:Demultiplexing Device
233:Frame Buffer Device
234:Display Device
235:Display Panel and Driver 200:System
210:Encoding Apparatus
211:Capturing Device
212:Multiplexing Device
213:Frame Buffer Device
214:Depth Map
220:Transmitting Apparatus 230:Receiving Apparatus
231:Display Device Driver
232:Demultiplexing Device
233:Frame Buffer Device
234:Display Device
235:Display Panel and Driver

MULTIVIEW 3D IMAGE ENCODING METHOD, APPARATUS, SYSTEM AND STORAGE MEDIUM

CROSS-REFERENCE TO RELATED APPLICATION

This patent application is a national stage application of International Patent Application No. PCT/CN2022/084022, filed on Mar. 30, 2022, which claims priority of Chinese Patent Application No. 202210069609.9, filed on Jan. 21, 2022, both of which are incorporated by references in their entities.

TECHNICAL FIELD

The present application relates to the technical field of data processing, more in particular, to a multiview 3D image encoding method, apparatus, system and storage medium.

BACKGROUND

Displays that provide the impression of depth are generally referred to as 3D displays. The majority of 3D displays provide the 3D effect by either presenting the same left and right stereo image pair to all users by using special glasses or other optical means to channel the correct image to each eye, or they produce a series of perspective views that are derived from a single display panel. In both of these cases, the bandwidth requirement for transmission and storage is not considerably greater than the current requirement for monoscopic displays. However, conventional 3D displays that require the use of special glasses have proved to be unpopular with the viewing public, and those displays that give this effect but without the use of special glasses are referred to as 'autostereoscopic'. Although autostereoscopic displays are currently available, their performance may be limited where the resolution is reduced and the depth in the images is restricted, or they may require complex hardware that renders them unsuitable for a mass-market consumer product. In addition, there is a requirement for autostereoscopic displays providing good quality images.

If the multiview displays generally cannot provide a large number of views and consequently their image quality is limited. In order to provide better performance in terms of image resolution, usable viewing region and depth of field, the displays must provide a greater number of views whilst retaining perceived image resolution to obtain improved 3D performance, so that the difference between adjacent views is imperceptible. This must be supported by image capture and transmission system through which an effectively large number of images must pass. However, this means that a large amount of data information transmission and information processing operations will be involved in the process of image acquisition and transmission, thereby resulting in limited performance.

SUMMARY

There are provided a multiview 3D image encoding method, apparatus, system, and a storage medium in the embodiments of the present disclosure, so as to at least solve the problem of excessive transmission bandwidth and limited system performance due to the processing and transmission for a large number of views in related technologies, and will not cause the loss of data information.

According to an aspect of the present disclosure, an embodiment provides a multiview 3D image encoding method, which may include: acquiring image data of an image, and obtaining depth information containing a depth value of each pixel in the image based on the image data; grouping the image data into blocks, and calculating a perceived angular resolution of each object in blocks based on the depth information of each object in blocks respectively, where the perceived angular resolution of an object in blocks is a required maximum angular resolution that enables identification of the object in blocks; and configuring a respective encoding parameter for each object in blocks based on the perceived angular resolution of a respective one object in blocks, where the encoding parameter is configured such that a requirement of a respective encoding parameter for a respective object in blocks with a respective perceived angular resolution is met.

In some embodiments, grouping the image data into blocks, and calculating a perceived angular resolution of each object in blocks based on the depth information of each object in blocks respectively may include: grouping the image data into blocks by rows; calculating a maximum depth value of each object in blocks based on a depth value of each pixel in a respective one object in blocks; and obtaining a maximum angular resolution of each object in blocks as the perceived angular resolution of a respective one object in blocks based on the maximum depth value of the respective one object in blocks.

In some embodiments, configuring a respective encoding parameter for each object in blocks based on the perceived angular resolution of a respective one object in blocks may include: dividing the depth information into at least a first depth value and a second depth value, where the first depth value and the second depth value include different depth regions, for distinguishing different depth regions where the objects in blocks fall within; obtaining a respective first angular resolution and/or a first refresh rate, and a respective second angular resolution and/or a second refresh rate based on at least the first depth value and the second depth value, where the first angular resolution and the second angular resolution are respectively required angular resolutions for objects located in the different depth regions with the first depth value and the second depth value respectively, so as to distinguish the objects, and the first refresh rate and the second refresh rate respectively corresponds to the respective refresh rates for the objects located in the different depth regions having the first depth value and the second depth value respectively; and performing a comparison on the perceived angular resolution with the first angular resolution and the second angular resolution and configuring a respective angular resolution and/or refresh rate for each object in blocks in the image based on the comparison.

In some embodiments, configuring a respective angular resolution and/or refresh rate for each object in blocks in the image based on the comparison may include: configuring the first angular resolution and/or the first refresh rate for each object in blocks at an initial moment; and performing a determination as to whether or not the perceived angular resolution is greater than a currently configured angular resolution for each object in blocks, in response to a determination that the perceived angular resolution is greater than the currently configured angular resolution for each object in blocks, increasing a currently configured angular resolution and/or refresh rate, until the current configured angular resolution meets a requirement of the perceived angular resolution or reaches the second angular resolution, and then stopping configuring the angular resolution and/or the refresh rate.

In some embodiments, configuring a respective angular resolution and/or refresh rate based on a comparison for each object in blocks in the image further may include: performing a determination as to whether or not the perceived angular resolution of the object in blocks is greater than the second angular resolution, in response to a determination that the perceived angular resolution of the object in blocks is greater than the second angular resolution, calculating the angular resolution of each pixel in the block based on the depth value of each pixel in the block; and performing a determination as to whether or not a required angular resolution of the pixel is greater than the second angular resolution, in response to a determination that the required angular resolution of the pixel is greater than the second angular resolution, discarding information of the pixel.

According to another aspect of the present disclosure, an embodiment provides a multiview 3D image encoding apparatus, which may include: a plurality of capturing devices configured to acquire image data under various views; a multiplexing device configured to select an output of information in the image data acquired by the plurality of capturing devices based on a perceived angular resolution, so as to meet the requirements of different encoding parameters for different regions of the image data, where the perceived angular resolution is obtained based on depth information of the image data; and a frame buffer device configured to receive the output selected from the plurality of capturing devices by the multiplexing device, and updating buffer data based on the selected output; where, the encoding apparatus at least has a first operating mode configured with a first encoding parameter and a second operating mode configured with a second encoding parameter based on the output selected by the multiplexing device.

In some embodiments, the first encoding parameter at least may include a first angular resolution and/or a first refresh rate; and the second encoding parameter at least may include a second angular resolution and/or a second refresh rate.

In some embodiments, the plurality of capturing devices are configured with a first view group under the first operating mode; and a second view group under the second operating mode; where, the first view group and the second view group are determined based on a number of the plurality of capturing devices and the adopted operating mode, and a group result corresponds to the output selected from the plurality of capturing devices by the multiplexing device.

In some embodiments, the multiplexing device is configured for: at an initial moment, selecting the output by time-sharing and grouping-sharing according to the first view group at the first refresh rate; performing a determination as to whether or not the perceived angular resolution is greater than a currently configured angular resolution for each object in blocks, in response to the perceived angular resolution is greater than the currently configured angular resolution for each object in blocks, improving a currently configured refresh rate of the object in blocks, and/or changing the view groups of the plurality of capturing devices, until the currently configured angular resolution meets the requirement of the perceived angular resolution or the second angular resolution, and then stopping configuring the refresh rate and/or selecting the output from the plurality of capturing devices in a currently configured view group by time division and grouping.

In some embodiments, the frame buffer device is configured for: at an initial moment, refreshing the buffer data in full at the first refresh rate; refreshing the buffer data in the currently configured refresh rate of the object in blocks based on the output selected by the multiplexing device.

According to yet another aspect of the present disclosure, an embodiment provides a multiview 3D image encoding system, which may include an encoding apparatus as described above, a transmitting apparatus configured to transmit coded image data from the encoding apparatus, a receiving apparatus including a frame buffer device configured to receive the coded image data from the encoding apparatus and update the buffer data, and a de-multiplexing device configured to receive the coded image data stored in the frame buffer device, and obtain a decoded image data by decoding the coded image data, where the coded image data is obtained from the encoding apparatus by executing the encoding method as described above; and a display apparatus configured to display the decoded image data from the demultiplexing device.

According to yet another aspect of the present disclosure, an embodiment provides a multiview image encoding apparatus, which may include: a memory configured to store a program; and a processer configured to execute the program stored in the memory which, when executed by the processor, causes the processor to carry out steps of the encoding method in the above-described embodiments.

According to yet another aspect of the present disclosure, an embodiment provides a computer-readable storage medium storing computer programs which, when executed by a processor, cause the processor to carry out steps of the encoding method in the above-described embodiments.

Embodiments proposed by the present disclosure can effectively mitigate the image jitter problem between adjacent views by capturing image data under various views. In addition, the angular resolution information is calculated based on the depth information of the captured images, and different encoding parameters are configured based on the different requirements of different objects in the image for the perceived angular resolution. It can effectively reduce the transmission and processing of redundant information, greatly reduce the transmission bandwidth and processing complexity, and can meet the demand of compressed data during the acquisition and transmission for the multiview 3D display transmission system, thereby effectively improving the performance of the system.

Additional features and advantages of the present disclosure will be set forth in the subsequent specification, and in part become apparent from the specification or may be learned by practice of the present disclosure. The purposes and other advantages of the present disclosure can be realized and obtained by structures specified in the specification, the claims and the accompanying drawings.

BRIEF DESCRIPTION OF DRAWINGS

The accompanying drawings are used to provide a further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

FIG. 5 is a flowchart of a multiview 3D image encoding method according to an embodiment of the present disclosure;

FIG. 6 is a flowchart of step S200 in FIG. 1 according to an embodiment of the present disclosure;

FIG. 7 is a flowchart of step S300 in FIG. 1 according to an embodiment of the present disclosure;

FIG. 10*a* is a depth map for controlling region selection of image capture along planes X-X in FIG. 8 according to an embodiment of the present disclosure;

FIG. 10*b* is a depth map for controlling region selection of image capture along planes Y-Y in FIG. 8 according to an embodiment of the present disclosure;

FIG. 12 is a flowchart of step S330 in FIG. 7 of an embodiment of the present disclosure;

FIG. 13 is a flowchart of step S330 in FIG. 7 according to another embodiment of the present disclosure;

DETAILED DESCRIPTION

In order to make the objectives, technical schemes and advantages of the present disclosure more apparent, the present disclosure is further described in detail in conjunction with the accompanying drawings and embodiments. It should be understood that the specific embodiments described here are only intended to explain the present disclosure and are not intended to limit the present disclosure.

It should be known that, in the description of the embodiments of the present disclosure, "a plurality of (or multiple)" means two or more; "greater than", "less than", "over", etc. are to be understood to exclude the given figure; and "above", "below", "within", etc. are understood to include the given figure. If "first", "second" and "third", etc. are referred to, it is only for the purpose of distinguishing technical features, and shall not be understood as indicating or implying relative importance or implying the number of the indicated technical features or implying the sequence of the indicated technical features.

Any 2D display that provides motion parallax must show different perspective images that are dependent on the viewer position thus giving the impression of an image variation in the same manner as in the observation of a natural scene. This means that the light emitted from each pixel of the display must change with an emergent angle. Therefore, unlike in single view displays where only spatial resolution needs to be considered, the additional resolution is required in 3D displays to provide a series of different discrete views in different horizontal directions, where the angle subtended by each view defines the angular resolution of the display and this determines its 3D performance in terms of the depth of field of the image, the depth of the viewing region and user comfort. The concept of angular resolution is critical to determine 3D performance with respect to the depth of the image domain, the depth of the viewing area and user comfort. The angular resolution refers to the resolving power of an imaging system or a component of a system, i.e., the ability of an imaging system or system element to differentiate between two adjacent objects with minimum spacing. The resolving power is generally expressed in terms of the size of the angle spread between the two smallest discernible targets by the imaging system, and the total amount of data required is determined by the angular resolution multiplied by the number of pixels.

Figure 1:
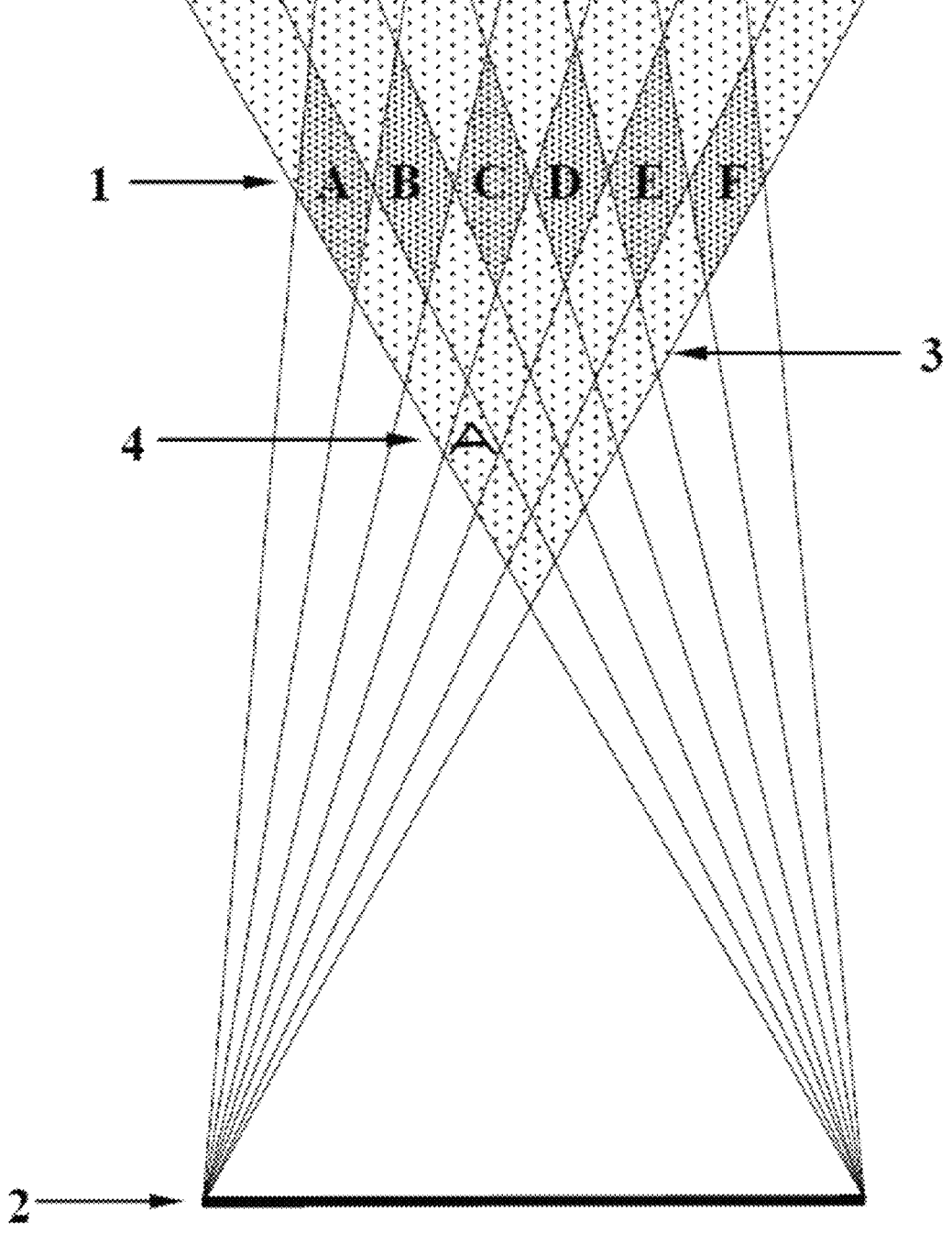
FIG. 1 is a plan view of view zones in a multiview display.

It should be noted that, firstly, the displays used by the coded signals provide horizontal parallax only so the perspective view changes as a viewer moves laterally but does not change with vertical movement. This considerably reduces the amount of information that has to be displayed. Secondly, a series of views may be repeated several times across the viewing field. This not only reduces the amount of information to be displayed, but also reduces the available viewing region to a certain extent. As shown, FIG. 1 shows a plan view of six viewing zones (A-F) produced by screen 2. As a user moves from left to right on the figure, the perspective rotates in a clockwise direction from the user relative to the display. In this example, the view widths are large with respect to the screen width and therefore the angular resolution is low.

Figure 2:
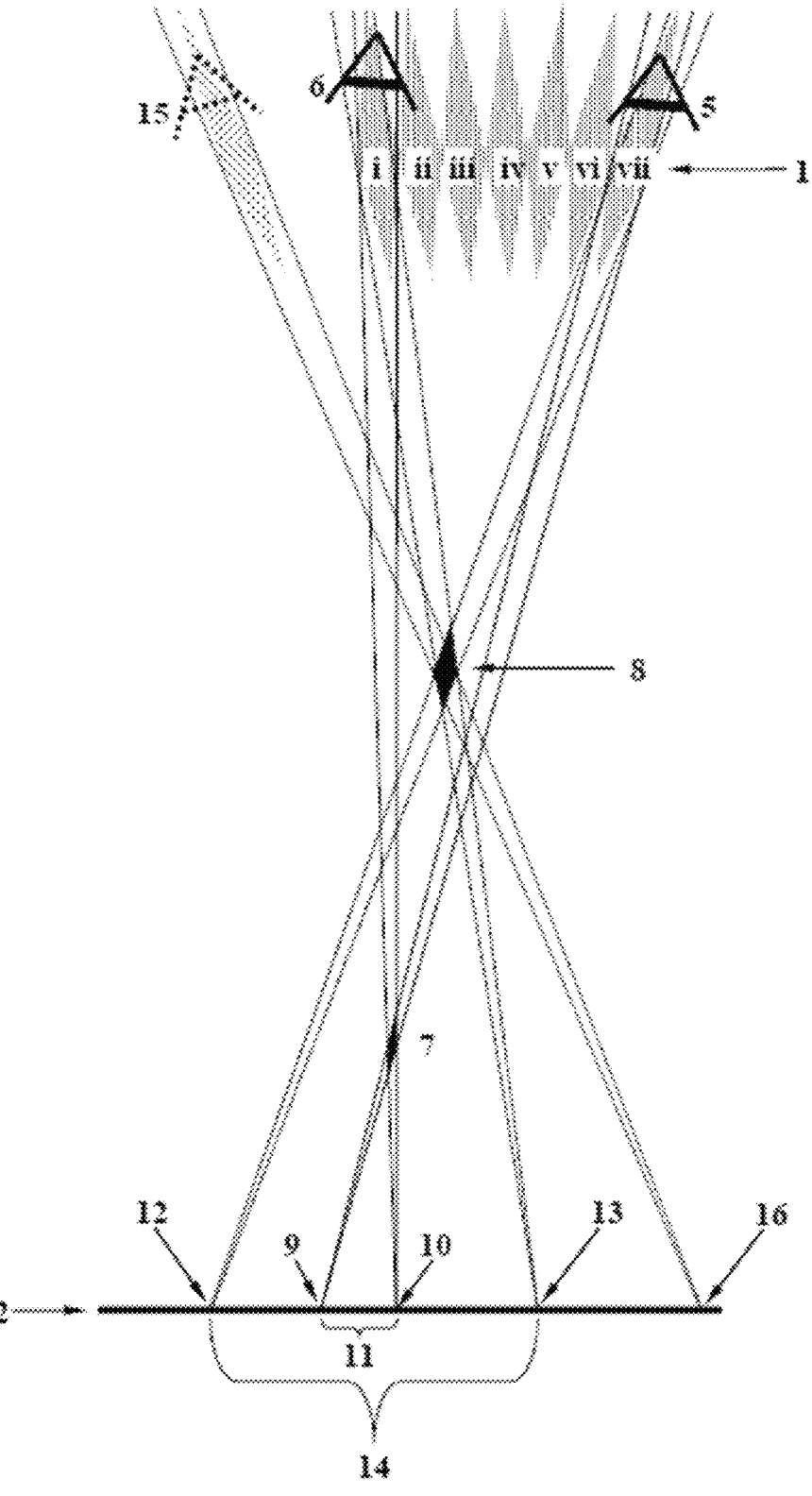
FIG. 2 is a plan view of 'voxels' produced at differing distances.

For a better understanding, each perceived solid element in the image in the volume around the display is referred to as a 'voxel'. Referring to FIG. 2, the voxels 7, 8 are formed by the intersection of viewing zone rays closer to the screen 2 than the actual zones 1 themselves. This is the three-dimensional equivalent of a pixel in a two-dimensional display. The closer voxel 7 to the screen 2 is formed by rays from the vicinities of points 9 and 10 on the screen to the left eye 5 and right eye 6 respectively that are located in Zones vii and i. Rays emitted from the screen over the region 11 between points 9 and 10 all pass though the voxel 7 to be observed over a continuous array of viewing zones from i through to vii. The further voxel 8 to the screen 2 is formed by rays from the vicinities of points 12 and 13 on the screen to the left eye 5 and right eye 6. Rays emitted from the screen over the region 14 between points 12 and 13 all pass through the voxel 8 to be observed in a continuous array of viewing zones from i through to vii. It should be noted that in practice the viewing zones will extend either side of the ones illustrated and an example of one of these is shown to the left where eye 15 observes rays from the vicinity of point 16 on the screen 2 that pass through the voxel 8. FIG. 2 only shows voxels that are created by crossed disparity in front of the screen, otherwise known as negative disparity. It can be understood that voxels can also be formed behind the screen by uncrossed disparity, otherwise known as positive disparity.

If there are a large number of views where each only subtends a small angle, the perceived voxel will be substantially parallelogram-shaped with its width and depth proportional to its distance from the screen. As a voxel of a given size increases in distance from the plane of the screen, whether in front of it or behind it, the angle it subtends from the screen becomes smaller. Therefore, the angular resolution required to display a given size of voxel becomes greater with increasing distance. In general, scenes will portray regions at differing distances from the screen so that the angular resolution requirement varies across the screen area. If the display works in a low-resolution mode, the objects far away from the screen will have discontinuity problems in adjacent views, while if the display works in a high-resolution mode, significant computing resources and storage resources will be consumed.

In view of this, there is provided a multiview 3D image encoding method in an embodiment of the present disclosure, which can effectively alleviate the image discontinuity problem between adjacent views by acquiring image data under various views. In addition, the angular resolution information is calculated by the depth information of the captured image, and the redundant information in the image is identified and discarded based on the angular resolution information. The redundant information of the image data is used to ensure that the data amount can be minimized in information transmission and information processing, thus reducing transmission bandwidth and storage capacity and improving the efficiency of information transmission and processing. And at the same time, different suitable encoding parameters are configured based on the different requirements of different objects in the image for the perceived angular resolution, which greatly reduces the transmission bandwidth and processing complexity, and satisfies the demand for compressed data in the process of acquisition and transmission of multiview 3D display and transmission system, while no loss is caused to the effective data information, thereby realizing lossless compression of data.

The embodiments of the present disclosure will be described in detail below with reference to the accompanying drawings.

Figure 3:
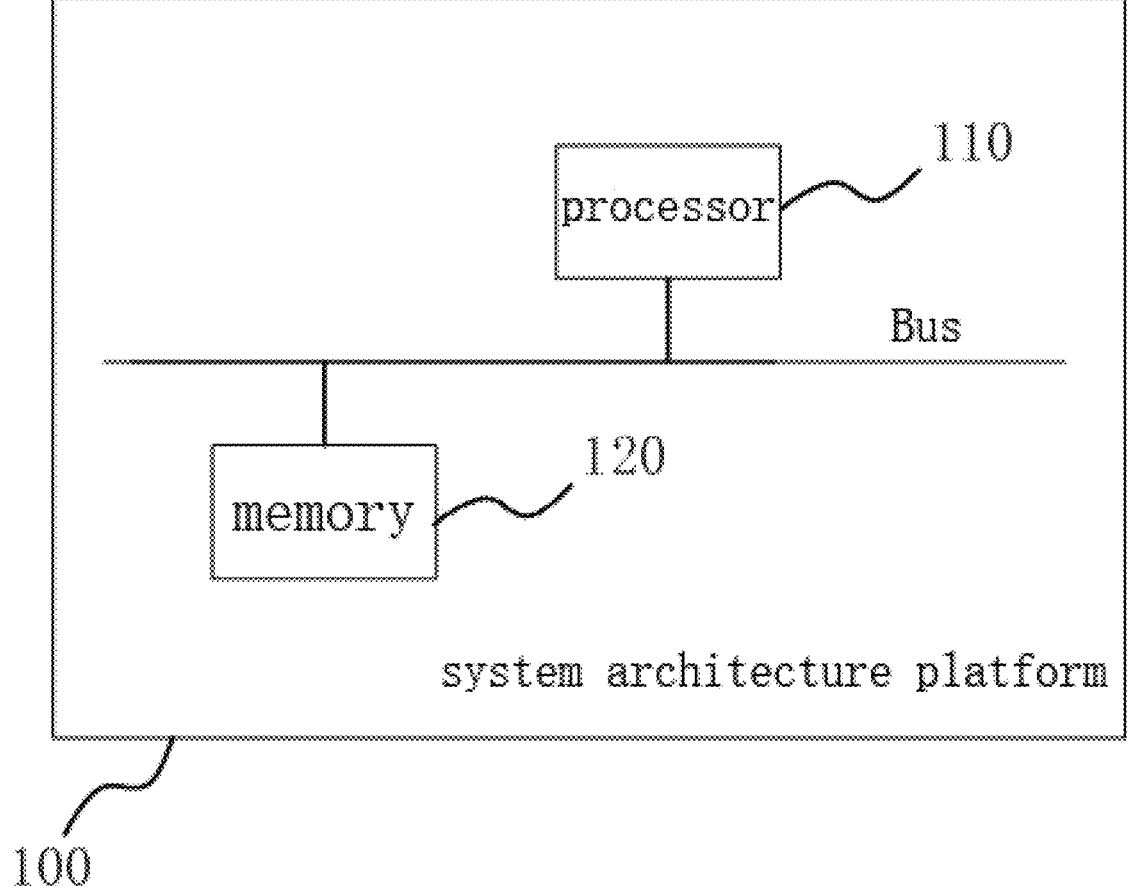
FIG. 3 is a schematic diagram of a system architecture platform 100 according to an embodiment of the present disclosure applied to carry out the multiview 3D image encoding method.

As shown, FIG. 3 is a schematic diagram of a system architecture platform 100 for carrying out the multiview 3D image encoding method according to an embodiment of the present disclosure.

In an example of FIG. 3, the system architecture platform 100 is provided with a processor 110 and a memory 120, where the processor 110 and the memory 120 may be connected via a bus which is shown by way of an example in FIG. 3, or in other ways.

The memory 120, as a non-transient computer-readable storage medium, can be used to store non-transient software programs as well as non-transient computer-executable programs. In addition, the memory 120 may include a high-speed random access memory and a non-transient memory, such as at least a magnetic disk memory, a flash memory, or other non-transient solid-state memory. In some embodiments, the memory 120 optionally includes memories remotely located with respect to the processor 110, and which may be connected to the system architecture platform 100 by means of a network. Instances of the above networks include, but are not limited to, the Internet, intranet, Local Area Network, mobile communication network, and combinations thereof.

It can be understood by a person having ordinary skills in the art that the system architecture platform 100 can be applied to a data processing system and the subsequent multiview 3D image encoding, transmission and display systems, etc., which is not specifically limited in this embodiment.

It can be understood by a person having ordinary skills in the art that the system architecture platform 100 shown in FIG. 3 does not constitute a limitation to the embodiments of this present disclosure, which may include more or fewer components than those shown, a combination of some components, or a different arrangement of components.

In the system architecture platform 100 as shown in FIG. 3, the processor 110 can invoke programs stored in the memory 120, so as to be applied to the multiview 3D image acquisition, encoding, transmission and display system and execute the multiview 3D image encoding method.

Various embodiments of the multiview 3D image encoding method, apparatus and system in this present disclosure are proposed below based on the above-mentioned system architecture platform.

Figure 4:
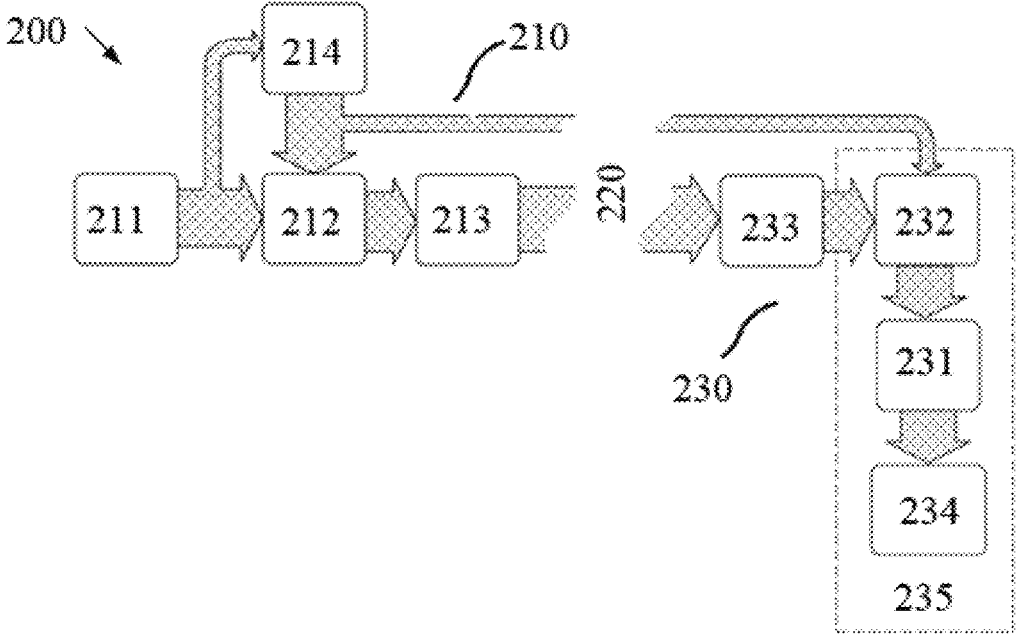
FIG. 4 is a schematic diagram of system 200 for a multiview 3D image capturing, encoding, transmitting and displaying according to an embodiment of the present disclosure.

As shown, FIG. 4 is a schematic diagram of a system 200 for multiview 3D image acquisition, encoding, transmission and display according to an embodiment of this present disclosure.

In an example of FIG. 4, the system 200 includes an encoding apparatus 210, a transmitting apparatus 220 and a receiving apparatus 230. The coding apparatus 210 includes a capturing device 211, a multiplexing device 212 and a frame buffer device 213. The receiving apparatus 230 includes a display device driver 231, a demultiplexing device 232, a frame buffer device 233, a display device 234 and a display panel and driver 235.

In some embodiments, the capturing device 211 is configured to acquire image data under various views. The multiplexing device 212 is configured to select an output of information in the image data acquired by the plurality of capturing devices 211 based on a perceived angular resolution, so as to meet the requirements of different encoding parameters for the different captured image data. The perceived angular resolution is obtained based on depth information of the image data captured by the plurality of capturing devices 211. The frame buffer device 213 is configured to receive the output selected from the capturing devices 211 by the multiplexing device 212, and update buffer data based on the selected output. The encoding apparatus 210 at least has a first operating mode configured with a first encoding parameter and a second operating mode configured with a second encoding parameter based on the output selected by the multiplexing device 212. The perceived angular resolution is the required maximum angular resolution that enables identification of two adjacent objects in image data. In some embodiments, the display device driver 231 is configured to drive the display device 234. The display panel and driver 235 includes the display device driver 231, the demultiplexing device 232 and the display device 234.

In some embodiments, a subject capable of identifying a required maximum angular resolution for each object in the block, can be any device, such as but not limited to, a display device at an end of the encoding apparatus 210 in the system 100, a display element on the capturing device 211, or the display device 234 at the receiving apparatus 230 in the system 100, with imaging capability, which will be collectively referred to as the imaging device in the following.

As shown in FIG. 2, if some regions in these views depict an object that does not appear to be close to the screen, then its appearance will be shifted laterally in each successive view, causing a discontinuity in the image. When the number of views is increased, the difference between adjacent views is reduced, so the discontinuities between adjacent views seen on the screen become less noticeable. In this way, an increasing number of views increases the usable viewing depth. In some embodiments, the number of views participated is controlled by selecting the outputs of the capturing device 211 by the multiplexing device 212, thereby controlling the available viewing depth to meet the requirement of the imaging device for different angular resolutions for different regions of the captured image data.

In some embodiments, the plurality of the capturing devices 211 are configured with a first view group under the first operating mode, and with a second view group under the second operating mode. The first view group and the second view group are determined based on a number of capturing devices 211 and the adopted operating mode. And a grouping result corresponds to the output selected from the capturing devices 211 by the multiplexing device 212.

In some embodiments, the multiplexing device 212 is configured to select the output from capturing device 211 by time-division and grouping according to the first view group at the first refresh rate, at an initial moment; performing a determination as to whether or not the perceived angular resolution is greater than a currently configured angular resolution for each object in blocks, in response to a determination that the perceived angular resolution is greater than the currently configured angular resolution for each object in blocks, increasing a currently configured refresh rate of the object in blocks, and/or changing the view groups of the capturing devices 211, until the currently configured angular resolution meets the requirement of the perceived angular resolution or reaches the second angular resolution, and then stopping configuring the refresh rate and/or selecting the output from the capturing devices 211 by time division and grouping at the currently configured view group.

In some embodiments, the frame buffer device 213 is configured to refresh the buffer data at the first refresh rate, at an initial moment; and then to refresh the buffer data at the currently configured refresh rate of the object in blocks based on the output selected from the capturing devices 211.

It can be understood that, the encoding apparatus 210 is substantially responsible for the capture of image data. At the same time, based on the requirements of different angular resolutions for different areas of the captured image data, the multiplexing device 212 is deployed to output the collected image data selectively, and the selected outputs are stored into the frame buffer device 213, so as to be transmitted to the receiving apparatus 230 with the least amount of data via the transmitting apparatus 220. Thus the transmission bandwidth and the complexity of data processing are reduced, improving the performance of the system.

In some embodiments, the transmitting apparatus 220 is configured to transmit the encoded image data from the encoding apparatus 210. It can be understood that the transmitting apparatus 220 here can be a wired transmission medium or a wireless transmission medium.

In some embodiments, the receiving apparatus 230 includes a frame buffer device 233 configured to receive the coded image data from the encoding apparatus 210 and to update the buffer data, and a demultiplexing device 232 configured to receive the coded image data stored in the frame buffer device 233 and obtain a decoded image data by decoding the coded image data. The coded image data is obtained by executing the multiview 3D image encoding method, which will be described below, by the encoding apparatus 210. In some embodiments, the parameter configurations of the frame buffer device 233 and the demultiplexing device 232 in the receiving apparatus 230 are consistent with those of the frame buffer device 213 and the multiplexing device 212 in the encoding apparatus. The display apparatus is configured to display the decoded image data from the demultiplexing device 232.

The operation of the whole system will be described with details below, for example, the multiplexing device 212 and the frame buffer device 213 cooperate to meet the requirement of different angular resolutions for the imaging system (e.g., the display element on the capturing device 211 or the display device 234 of the receiving apparatus 230). An embodiment of the present disclosure will be described based on the above system in conjunction with the specific workflow shown in FIG. 5 which depicts the multiview 3D image encoding method.

As shown, FIG. 5 is a flowchart of a multiview 3D image encoding method according to an embodiment of the present disclosure. The method includes the following steps.

Step S100, acquiring image data of an image, and obtaining depth information containing a depth value of each pixel in an image based on the image data.

Step S200, grouping the image data into blocks, and calculating a perceived angular resolution of each object in blocks based on the depth information of each object in blocks respectively, where the perceived angular resolution of an object in blocks is a required maximum angular resolution that enables identification of the object in blocks.

Step S300, configuring a respective encoding parameter for each object in blocks based on the perceived angular resolution of a respective one object in blocks, where the encoding parameter is configured such that a requirement of respective encoding parameter for a respective object in blocks with a respective perceived angular resolution is met.

In some embodiments, in step S100, the image data is acquired by a plurality of capturing devices 211. The plurality of capturing devices 211 respectively have different views for acquiring image data under different views. Based on the image data under each view, the depth information (i.e., the depth map 214 shown in FIG. 4 of the image data under each view is calculated respectively, the depth map contains the depth value of each pixel in the image.

It can be understood that the effective resolution required for the imaging device is proportional to the distance of a displayed point from the screen of the imaging device. The farther the displayed pixel is from the screen of the imaging device, the higher the required effective angular resolution. However, even if the imaging device has a high angular resolution capability, it is not necessary to operate with full resolution all the time. For objects that can be clearly identified only with low resolution, it is a great waste of the storage resources and the transmission bandwidth for the system 100. Therefore, the image data is grouped into blocks, depth information is calculated for each object in blocks, the perceived angular resolution of each object in blocks is calculated by using the depth information, and a respective encoding parameter is configured for a respective one object in blocks based on the perceived angular resolution of the respective object in blocks respectively, and different encoding parameters correspond to different operating modes of the system 100.

As shown, FIG. 6 is a flowchart of step S200 in FIG. 1 according to an embodiment of the present disclosure. In some embodiments, step S200 includes: step S210, grouping the image data into blocks by rows, the width of which is the given number of pixels across a row of the displayed image, and the height of which is the number of views (the number of the capturing devices 211) used to acquire the image; step S220, calculating a maximum depth value of each object in blocks based on a depth value of each pixel in a respective one object in blocks; step S230, obtaining a maximum angular resolution of each object in blocks as the perceived angular resolution of a respective one object in blocks based on the maximum depth value of the respective one object in blocks. Taking the maximum angular resolution of the object in each block as the perceived angular resolution can not only meet the requirement of the imaging system for different angular resolutions of each pixel of the object in the block, but also avoid the waste of resources caused by full-time operation of the system in full resolution mode.

FIG. 7 is a flowchart of step S300 in FIG. 1 according to an embodiment of the present disclosure. In some embodiments, step 300 includes: step S310, dividing the depth information into at least a first depth value and a second depth value. The first depth value and the second depth value include different depth regions, for distinguishing different depth regions where the objects in blocks fall within; step S320, obtaining a respective first angular resolution and/or a first refresh rate, and a respective second angular resolution and/or a second refresh rate based on at least the first depth value and the second depth value. The first angular resolution and the second angular resolution are respectively required angular resolutions for objects located in the different depth regions with the first depth value and the second depth value respectively, so as to distinguish the objects, and the first refresh rate and the second refresh rate respectively correspond to the respective refresh rates for the objects located in the different depth regions having the first depth value and the second depth value respectively; and step S330, performing a comparison on the perceived angular resolution with the first angular resolution and the second angular resolution and configuring a respective angular resolution and/or refresh rate for each object in blocks in the image based on the comparison.

It can be understood that the depth information can be divided into different gradients in order to quantify the depth information, thus facilitating the calculation of the subsequent angular resolution. It can be understood that the division of depth information, the number of views, the setting of the angular resolution and refresh rate are all non-restrictive and can be other numerical values, and the specific numerical values enumerated herein are merely illustrative. In some embodiments, the division of depth information is related to the configuration of the capturing device 211. For example, the capturing device 211 with 16-view can include 4-view mode, 8-view mode and 16-view mode. That is, the corresponding depth values can be divided into a first depth value, and then a second depth value and a third depth value, and a corresponding first angular resolution, second angular resolution and third angular resolution and/or a first refresh rate, second refresh rate and third refresh rate can be calculated respectively based on the depth values.

Figure 8:
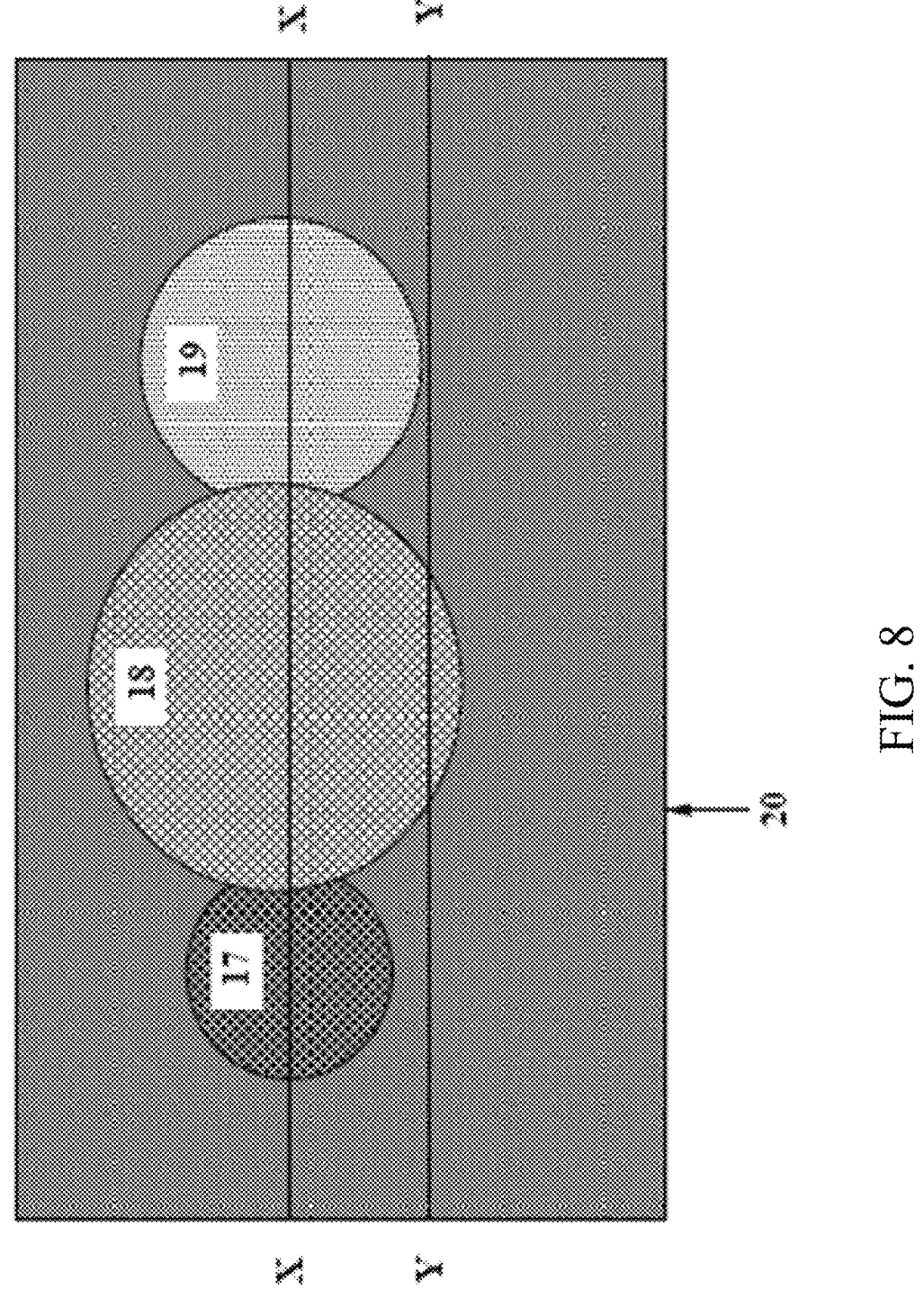
FIG. 8 is a schematic diagram of three spheres (17, 18, 19) with differing sizes and distances in front of an angled flat background according to an embodiment of the present disclosure.

FIG. 8 is shown by way of an example, which depicts a schematic diagram of three spheres (17, 18, 19) with differing sizes and distances in front of an angled flat background 20 according to an embodiment of the present disclosure, where X-X and Y-Y are horizontal planes that pass through the different rows of pixels in the image, and 2 denotes the screen of the capturing device 211.

Figure 9A:
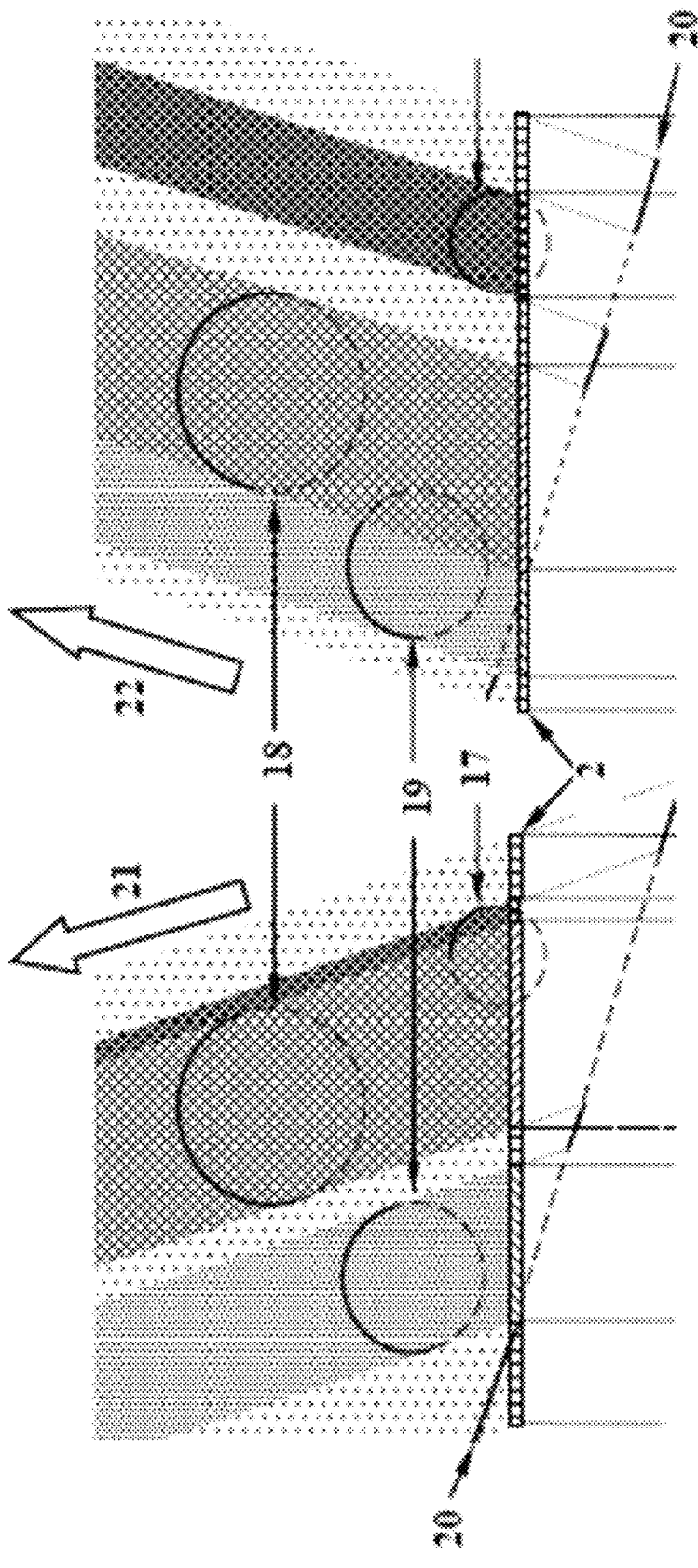
FIG. 9*a* is a schematic diagram of an image displayed in FIG. 8 according to an embodiment of the present disclosure.

FIG. 9a is a schematic diagram of an image displayed in FIG. 8 according to an embodiment of the present disclosure, where the largest sphere 18 occludes most of the small sphere 17 from the rightmost side of the viewing field and some of the medium size sphere 19 from the leftmost side. The complete sphere sections and the complete length of the flat surface are indicated as this makes the figure easier to understand. The direction of View 1 is indicated by the arrow 21 and the direction of the highest number View N is indicated by the arrow 22. In the following example, the value of N is 16, but it can be understood that N can be other numerical values. For clarity, the rays for each direction of view are shown as being parallel, but in practice, they will converge at a point that is located on the centerline of the viewing zone 1.

Figure 9B:
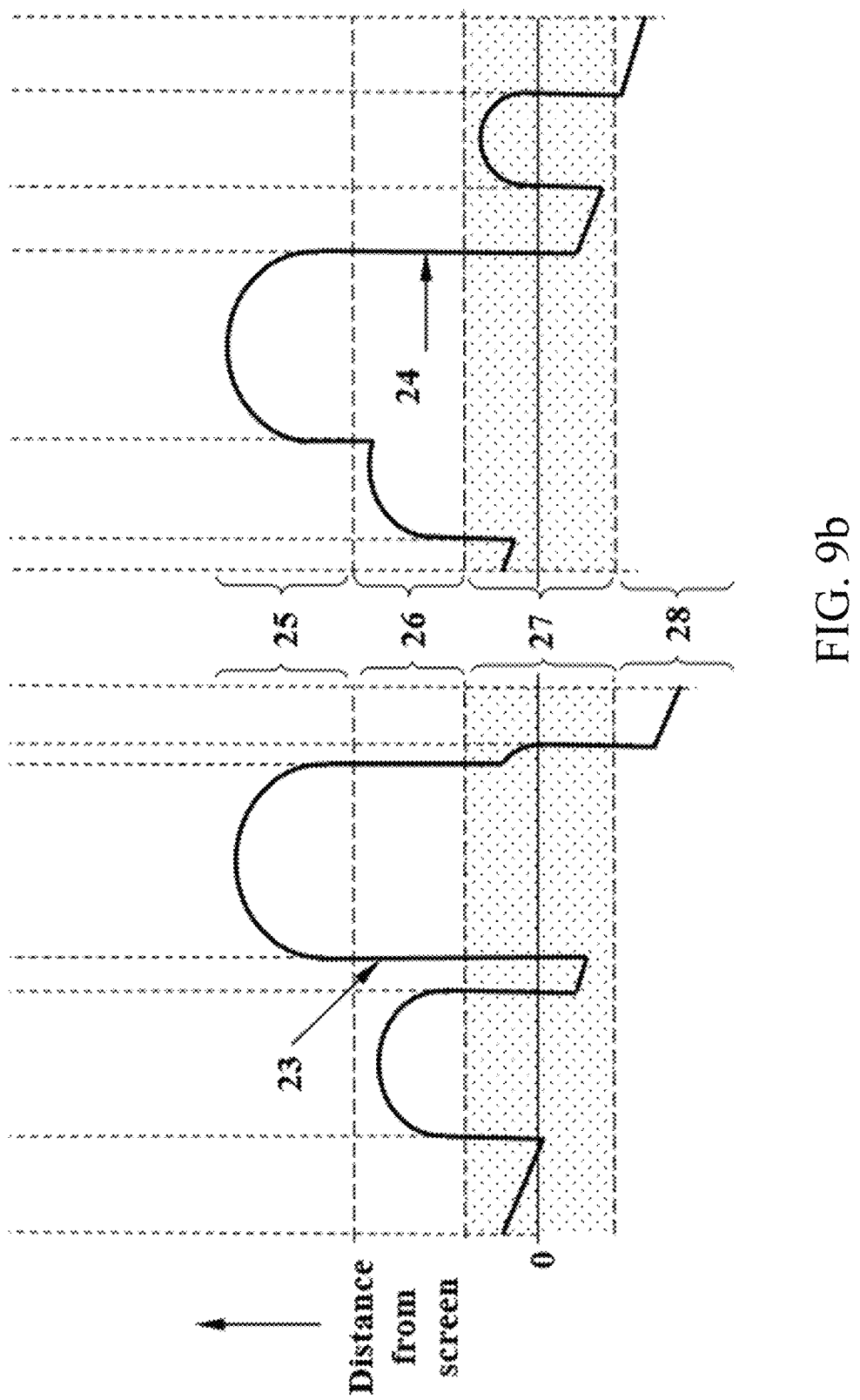
FIG. 9*b* illustrates profiles 23 and 24 of the "slice" of the scene surface as produced by View 1 and by View N intersected by the plane X-X according to an embodiment of the present disclosure.

The profiles 23 and 24 of the 'slice' of the scene surface as produced by View 1 and by View N intersected by the plane X-X according to an embodiment of the present disclosure of FIG. 9b are generated by first projecting lines from the pixels down to the plots. The distance from the screen of the point in the image corresponding to the projection line for any given view gives the value of the Y coordinate on the projection line. As shown in FIG. 9b, the depth interval is divided into three different gradients, where, "27" represents the first depth interval closest to screen 0, which can be denoted by "1"; "26" and "28" represent the second depth interval in front of or behind screen 0, which can be denoted by "2"; and "25" represents the third depth interval from screen 0 (it is located in front of screen 0 as shown in the figure), and can be denoted by "4". It can be understood that the third depth value interval may also include the regions located behind the screen 0 at a distance from the third depth value of the screen 0. If some regions in these views depict an object that does not appear to be close to the screen then its appearance will be shifted laterally in each successive view, causing a discontinuity in the image. Although in this example, five depth ranges are given, it can be understood that it can be any other number.

For an imaging system with N views, there will be N separate plots. The complete set of data representing P row of pixels length is therefore a P×N matrix of depth values.

As the frame rate and angular output are in discretized intervals anyway, and also as the control of the resolution does not have to be precise, it will make the data handling simpler if pixel groups and view numbers are arranged in a similar manner to FIGS. 10*a* and 10*b*. This figure is an example of an imaging device with 16-view, which has three refresh rates and 32 groups of pixels. In this example, the refresh rates are assumed to be 60 Hz, 120 Hz and 240 Hz. FIG. 10*a* is a depth map for controlling image capture region selection along planes X-X in FIG. 8 according to an embodiment of the present disclosure. FIG. 10*b* is a depth map for controlling image capture region selection along planes Y-Y in FIG. 8 according to an embodiment of the present disclosure.

In the following description, an example of a multiview 3D image system with 16-view capability, a refresh rate of 240 Hz and a period of 4.17 ms are provided. The system operates in the basic mode of 4-view at which the basic refresh rate is 60 Hz and the period is 16.7 ms. This is merely an example with a small number of views for ease of explanation, and in practice, the number of views is likely to be considerably greater.

Figures 11A, 11B, 11C:
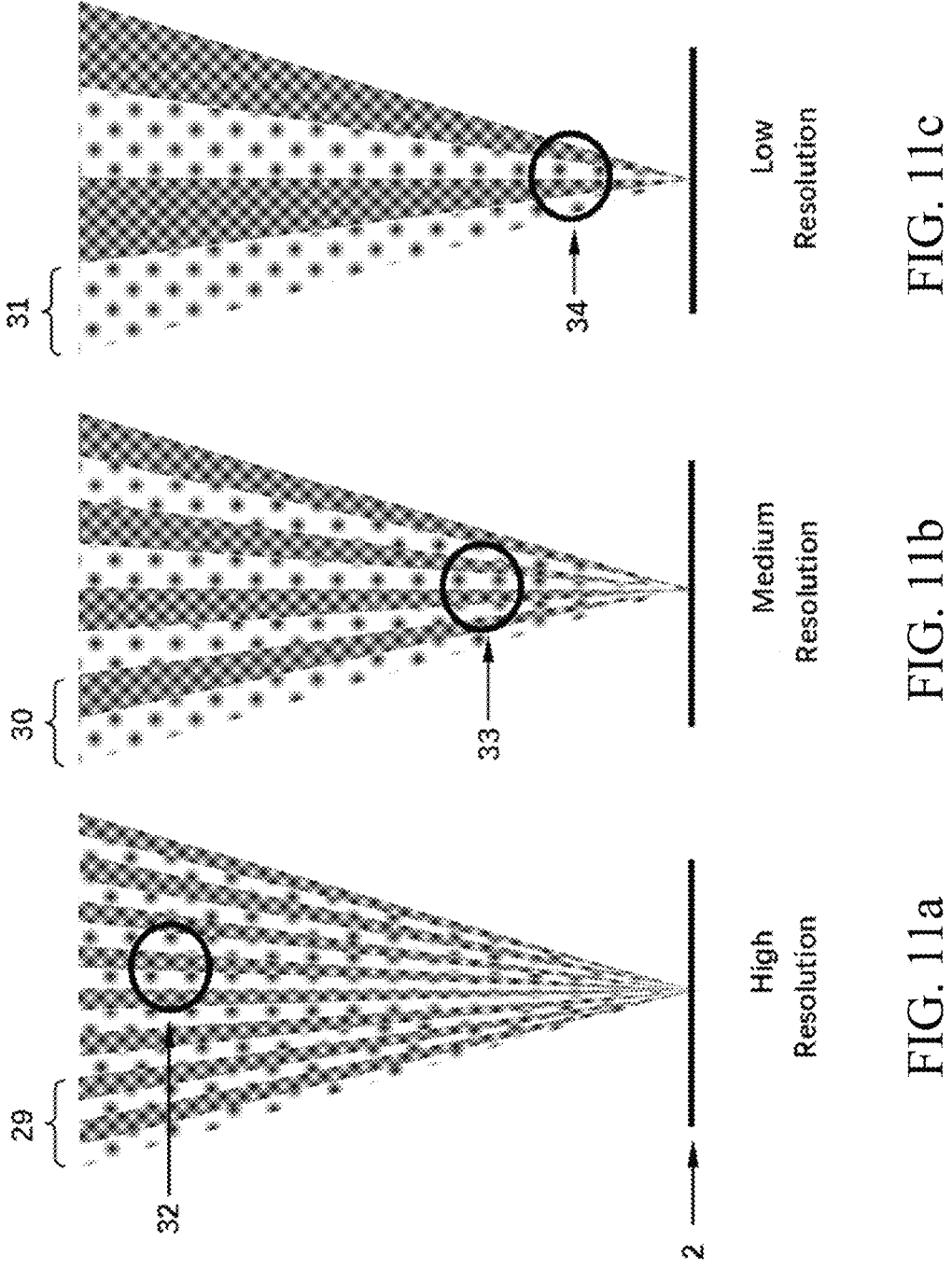
FIG. 11*a* is a schematic diagram of a high angular resolution of a 16-view-capable system according to an embodiment of the present disclosure.
FIG. 11*b* is a schematic diagram of a medium angular resolution of a 16-view-capable system according to an embodiment of the present disclosure.
FIG. 11*c* is a schematic diagram of a low angular resolution of a 16-view-capable system according to an embodiment of the present disclosure.

As shown in FIGS. 11*a*, 11*b* and 11*c*, a plan view of variable angular resolution of a 16-view-capable system according to an embodiment of the present disclosure. Alternate views are shown in dark and light shading in order to highlight the angular resolution. The high, medium and low modes represent 16-view, 8-view and 4-view modes respectively. In FIG. 11*a*, sixteen narrow zones are formed with four of them in the region 29. In FIG. 11*b*, the region 30 has two views in it giving a total of eight views. Whereas in FIG. 11*c*, region 31 has only one view giving a total of four views. The circled regions 32, 33 and 34 show the same view density (i.e., angular resolution) at different distances for the high, medium and low resolution modes respectively.

In some embodiments, for each object in blocks in the image, a comparison is performed on the perceived angular resolution with the first angular resolution and the second angular resolution and a respective angular resolution and/or refresh rate are/is configured based on the comparison.

FIG. 12 is a flowchart of step S330 in FIG. 7 of an embodiment of the present disclosure. In some embodiments, step S330 includes: step S331, configuring the first angular resolution and/or the first refresh rate for each object in blocks at an initial moment; step S332, performing a determination as to whether or not the perceived angular resolution is greater than a currently configured angular resolution for each object in blocks, in response to a determination that the perceived angular resolution is greater than the currently configured angular resolution for each object in blocks, increasing a currently configured angular resolution and/or refresh rate, until the currently configured angular resolution meets a requirement of the perceived angular resolution or reaches the second angular resolution, and then stopping configuring the angular resolution and/or the refresh rate.

FIG. 13 is a flowchart of step S330 in FIG. 7 according to another embodiment of the present disclosure. In some embodiments, step S330 further includes: step S333, performing a determination as to whether or not the perceived angular resolution of the object in blocks is greater than the second angular resolution, in response to a determination that the perceived angular resolution of the object in blocks is greater than the second angular resolution, calculating the angular resolution of each pixel in the block based on the depth value of each pixel in the block; step S334, performing a determination as to whether or not the required angular resolution of the pixel is greater than the second angular resolution, in response to a determination that the required angular resolution of the pixel is greater than the second angular resolution, discarding information of the pixel.

Figure 14:
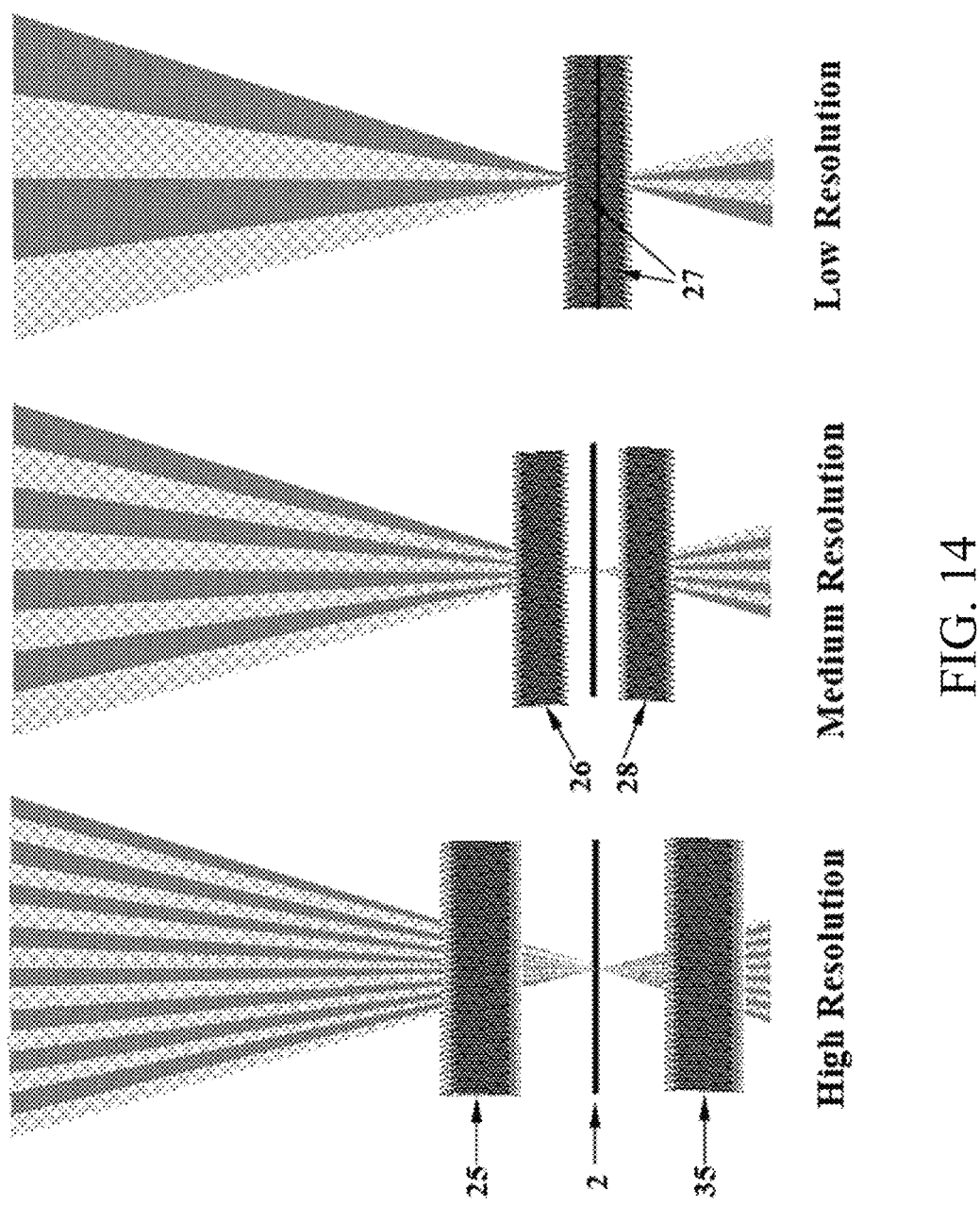
FIG. 14 is a schematic diagram of increasing angular resolution to apply to appropriate image regions in different resolution modes in FIGS. 11*a*-11*c* according to an embodiment of the present disclosure.

It can be understood that, when the number of views is increased, the difference between adjacent views is reduced, so the discontinuities between adjacent views seen on the screen become less noticeable. Therefore, an increasing number of views increases the usable viewing depth. The same considerations apply to the shaded region behind the viewing zones. As shown, FIG. 14 is a schematic diagram of increasing angular resolution to be applied to appropriate image regions under different resolution modes in FIGS. 11*a*-11*c* according to an embodiment of the present disclosure. In the area 27 surrounding the screen 2, the first angular resolution is applied. When the front and rear boundaries of the image appear unacceptably blurred in the horizontal direction, the number of views is doubled, and the second angular resolution is applied, so that acceptable images are present in the middle regions 26 and 28. When the images in these areas become unacceptable, the highest angular resolution (i.e., the third angular resolution) is applied in region 25. The overall depth of field is set by the outer boundaries. If the image is unacceptable even at the highest angular resolution, the objects in this depth area will be discarded. As the rejected information is incapable of being displayed and captured even under normal operating conditions. The encoding method has no data loss, so it is a lossless compression method. Therefore, the control of regular resolution can be realized by controlling the number of capturing devices 211 by the frame buffer device 213. That is, the frame buffer device 213 selects the output of the captured image data. In some embodiments, the control of regular resolution depends on the refresh rate, and thus can be performed merely at discrete frequencies lower than the multiple of the frame rate.

It can be understood that, in general, the pixels in the imaging device have to be refreshed during every frame due to the circuitry at each sub-pixel that requires the information stored in its capacitor being lost when the sub-pixel's row is addressed. Although each pixel may have to be addressed every frame, the information on it will invariably not have to be changed, therefore, the data of the memory unit in the frame buffer device 213 does not need to be updated all the time, and the transmission bandwidth and memory capacity in the driver can be reduced.

It can be understood that when the refresh rate slows down, the update speed of the buffered data in the frame buffer device 213 slows down, thereby the data transmission bandwidth is reduced. Moreover, for objects with high angular resolution, there are more details and relatively many differences between successive views, so a higher refresh rate is allocated. For objects with low angular resolution, there are fewer details and relatively few differences between successive views, so a lower refresh rate is allocated. In this way, no loss is caused to the data. Referring to FIG. 7, similar to the configuration of angular resolution, in the region 27 around the screen 2, the refresh rate is increased. As shown in this example, the refresh rate can be 60 Hz. In regions 26 and 28, the refresh rate can be 120 Hz. And in region 25, the refresh rate can be 240 Hz. It can be understood that the values 60 Hz, 120 Hz and 240 Hz are non-limiting, and can be other values. In some embodiments, in order to provide the required increased number of views, the multiplexing device 212 can be a spatio-temporal multiplexing device.

Figure 15:
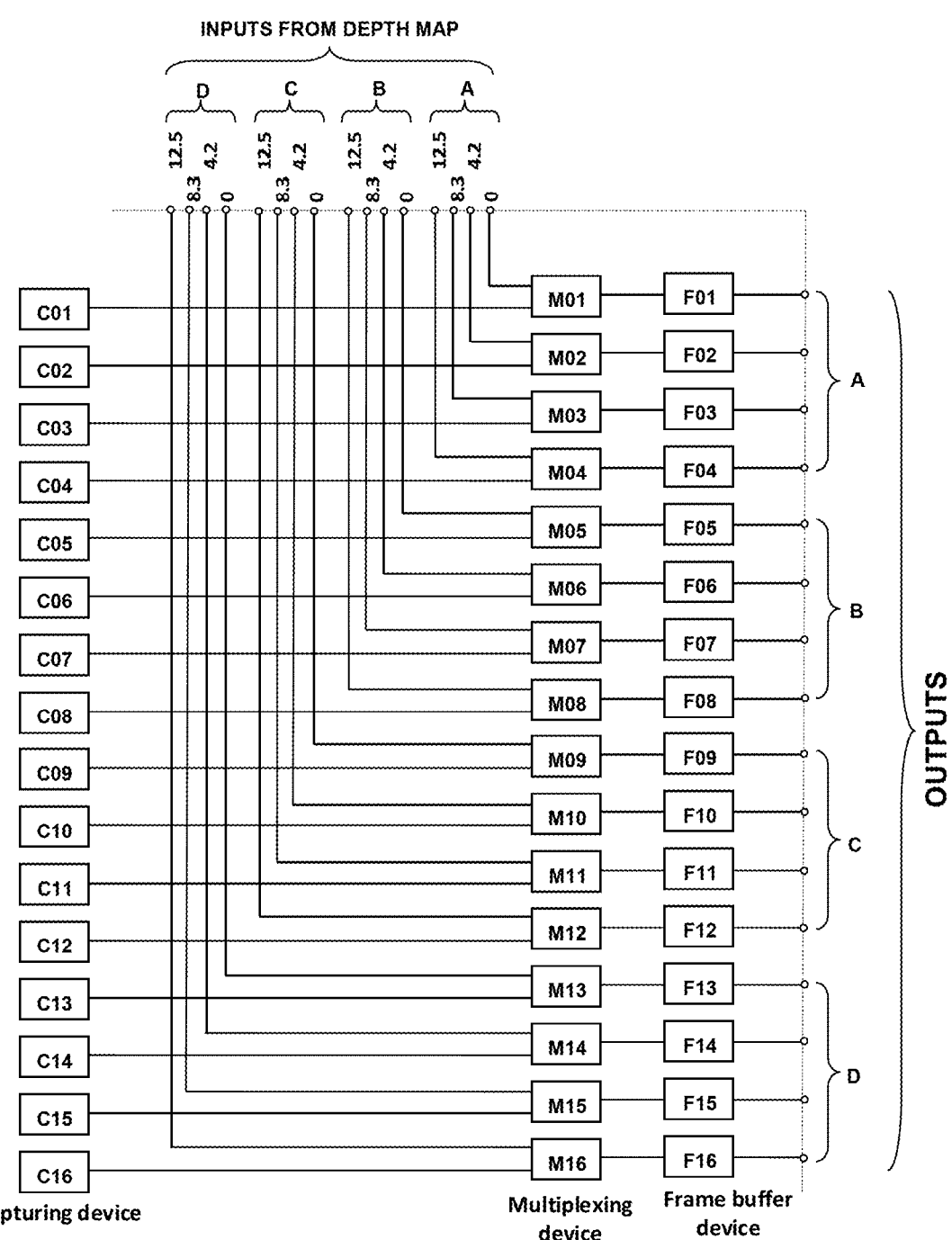
FIG. 15 is a block diagram of an arrangement of multiplexing devices (M01-M16) which select data to be written to frame buffer devices (F01-F16) by using depth map output according to an embodiment of the present disclosure.
Figure 16:
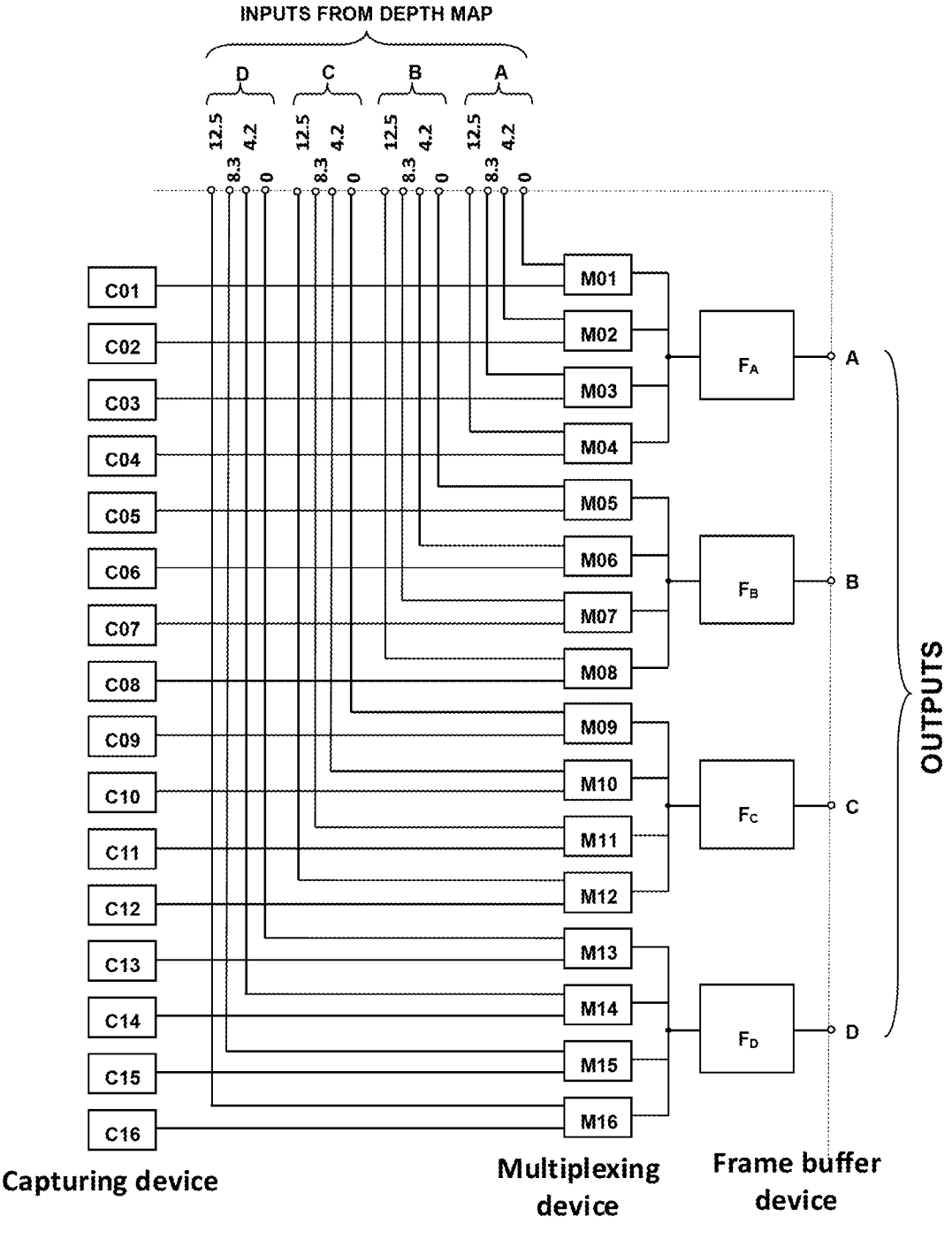
FIG. 16 is another block diagram of the arrangement of multiplexing devices (M01-M16) which select data to be written to frame buffer devices (FA-FD) by using depth map output according to an embodiment of the present disclosure.

As shown, FIG. 15 is a block diagram showing the acquisition devices (C01-C16) whose outputs are selected by the multiplexing devices (M01-M16) to load the frame buffer devices (F01-F16) as commanded by the outputs of the depth map. In this example, the encoding apparatus 210 with 16-view capability works in the 4-view mode (four views A, B, C and D in the figure) (i.e., the first operation mode with the first angular resolution and/or the first refresh rate), and the acquisition devices (C01-C16) have the first view grouping. Under this grouping, C01, C05, C09 and C13 belong to the first group, C02, C06, C10 and C14 belong to the second group, C03, C07, C11 and C15 belong to the third group, and C04, C08, C12 and C16 belong to the fourth group. The corresponding multiplexing devices (M01-M16) and frame buffering devices (F01-F16) are also configured in the same way. In this example, the acquisition devices (C01-C16), multiplexing devices (M01-M16) and frame buffer devices (F01-F16) have the same number. However, it can be understood that any number that can realize the control and storage functions in the multiview mode as described above can be adopted, and it is not intended to limit this here. For example, as shown in FIG. 16, there are only four frame buffer devices (FA, FB, Fc and FD), and each buffer dedicated to one group of acquisition devices (or views) and is refreshed four times every 16.7 ms period.

Figure 17:
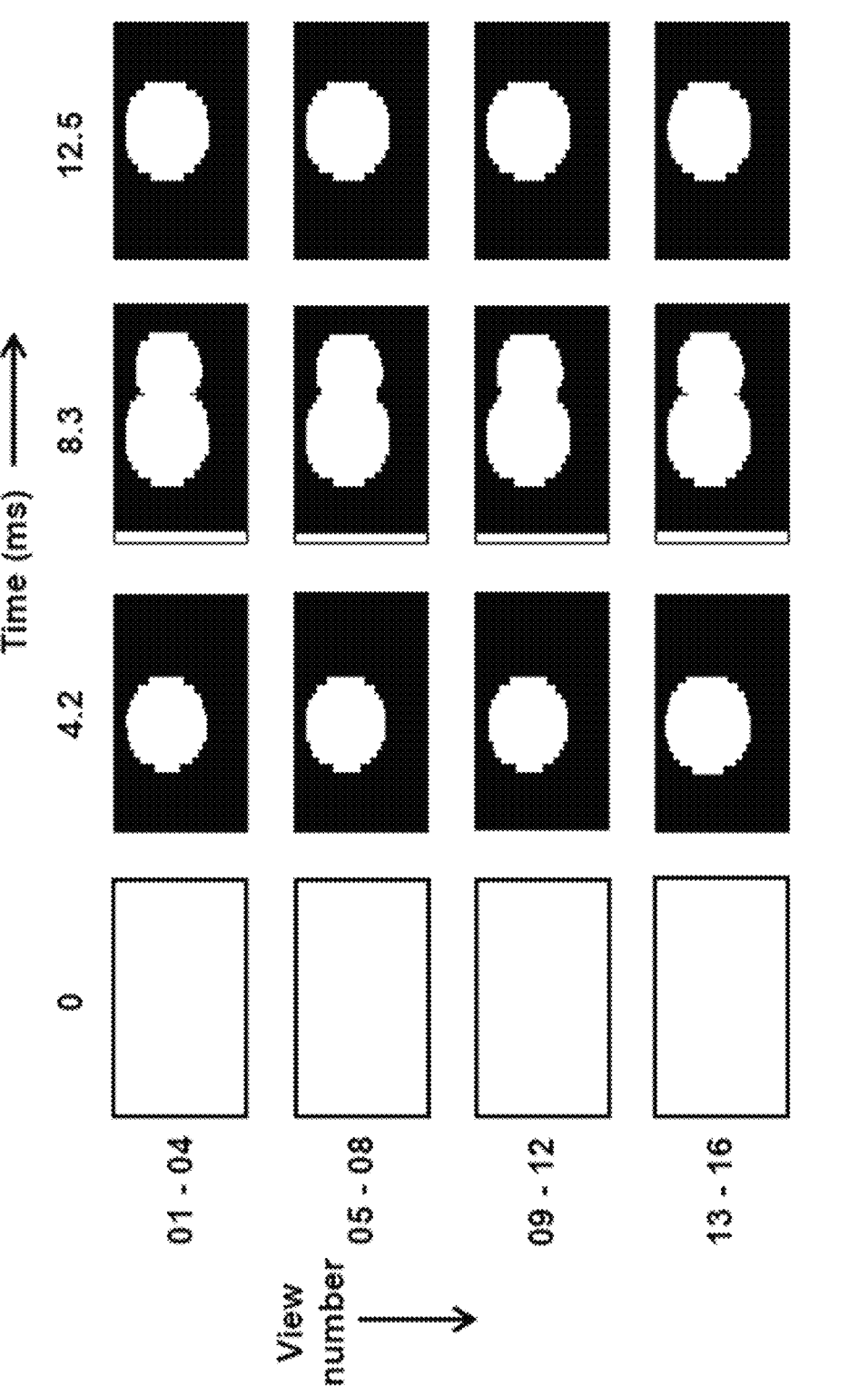
FIG. 17 shows the outputs of image selection of three spheres (17, 18, 19) in FIG. 8 according to an embodiment of the present disclosure.

In this case, the input of each of the four frame buffers in each group is determined by the outputs from the depth map that relate to the times Oms, 4.2 ms, 8.3 ms and 12.5 ms during the completed 16.7 ms cycle. At time Oms, all data in F01, F05, F09 and F13 is transmitted. At time 4.2 ms, all data in F02, F06, F10 and F14 is transmitted. At time 8.3 ms, all data in F03, F07, F11 and F15 is transmitted. At time 12.5 ms, all data in F04, F08, F12 and F16 is transmitted. In general, the images in the frame buffers will tend to have the following form. At time Oms, the image over the complete screen area is included as its complete area must be refreshed in order to prevent the display image from flickering. At time 4.2 ms, the image over a limited area only is included. At time 8.3 ms, the image over a larger area than at time 4.2 ms is included. At time 12.5 ms, the image over a similar area to that at 4.2 ms is included. The image area to be output selected from the acquisition device (C01-C16) will be displayed in FIG. 17. FIG. 17 shows the outputs of image selection of three spheres (17, 18, 19) in FIG. 8 according to an embodiment of the present disclosure. The white regions within the frames indicate the data that is stored and the black regions indicate where the data is discarded as this represents those parts of the image where a high angular resolution is not required, which include the part that does not need to be refreshed with low angular resolution and the part that cannot be displayed with higher angular resolution. The x-axes of the frames represent the pixel row number with zero at the top, and the y-axes represent the pixel number with zero on the left. As the imaging device exhibits horizontal parallax merely, any redundancy is exploited on a line-by-line basis. FIG. 17 is effectively a series of 'contour maps' of the captured scene.

Figure 18:
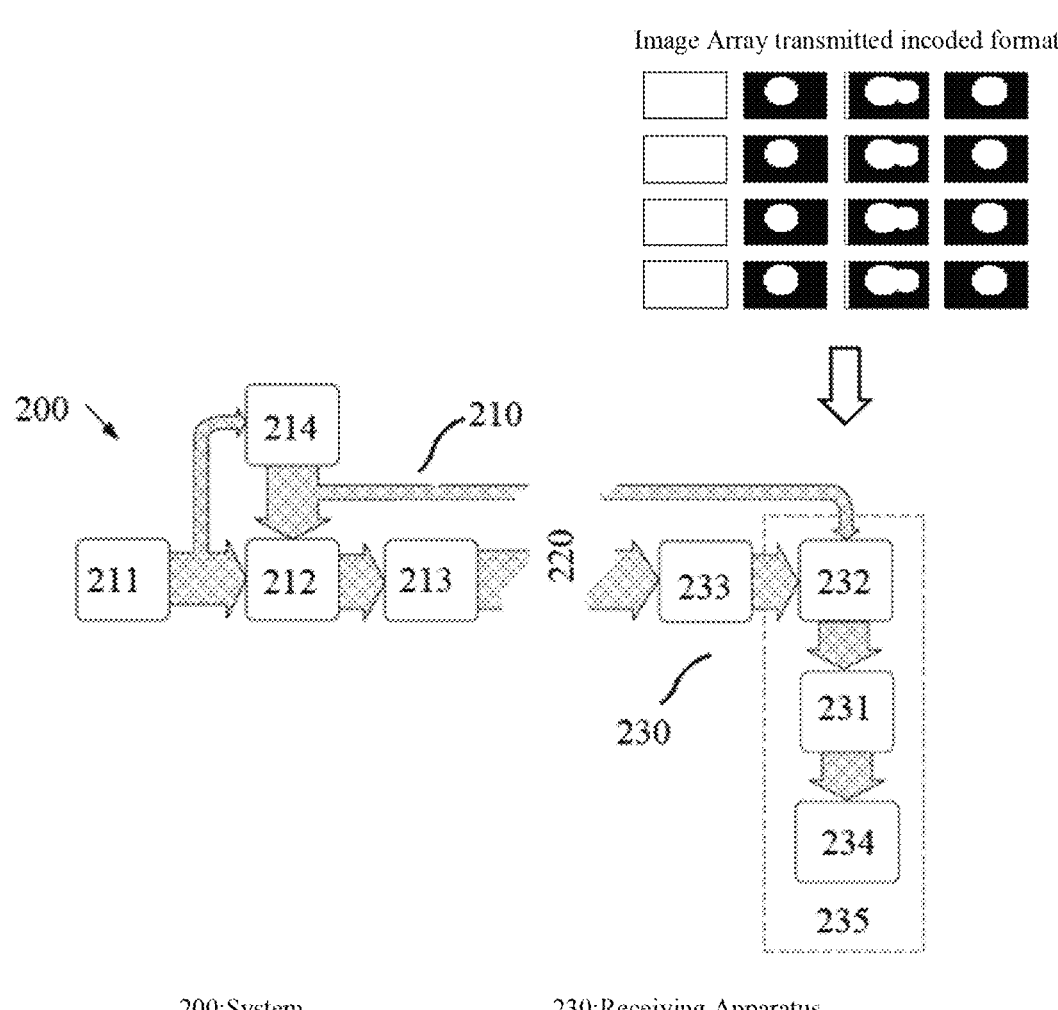
FIG. 18 is a schematic diagram of a complete transmission system according to an embodiment of the present disclosure.

FIG. 18 illustrates a schematic diagram of a complete transmission system according to an embodiment of the present disclosure. The matrix of sixteen images is transmitted from the frame buffer device 213 of the encoding apparatus 210 to the frame buffer device 233 of the receiving apparatus 230. The sparse nature of images used in conjunction with signal encoding enables their transmission with a considerably reduced bandwidth.

At the encoding apparatus, all of frame buffer devices 213 are fully refreshed at time Oms. At time 4.2 ms, in each row of frames, only the white regions are refreshed with the remaining black regions retaining the information that was written into the buffer 213 at time Oms. At time 8.3 ms, in each row of frames, only the white regions are refreshed with the remaining black regions retaining the information that was written into the buffer 213 at time Oms. At 12.5 ms, in each row of frames, only the white regions are refreshed with the remaining black regions retaining the information that was written into the frame buffer device 213 at times Oms and 8.3 ms.

Figure 19:
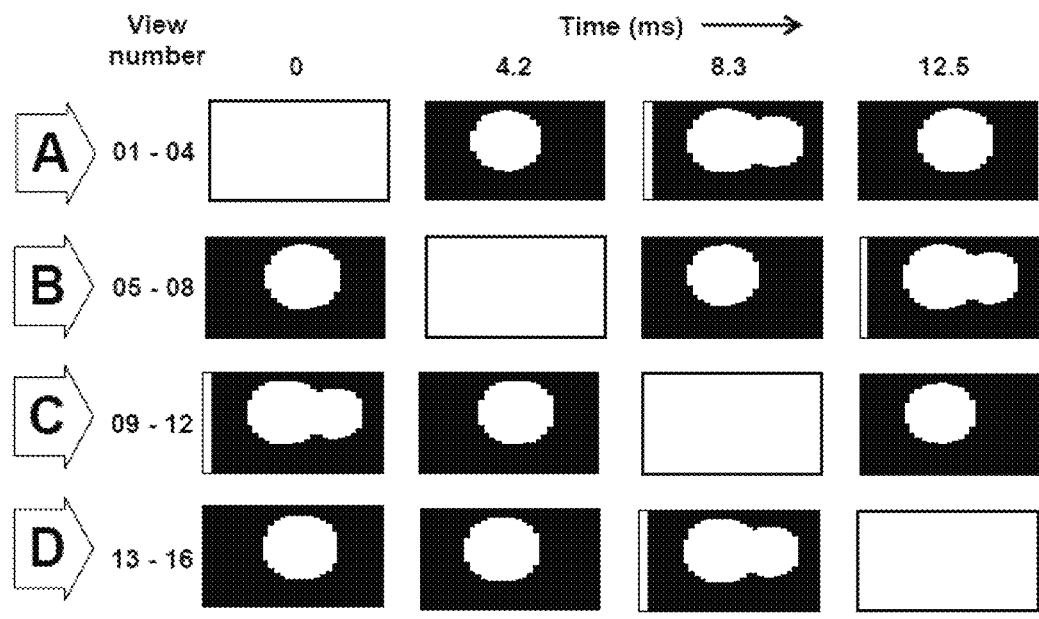
FIG. 19 is a flowchart of a method for assigning complete frame refreshes throughout a cycle according to an embodiment of the present disclosure.

FIG. 19 illustrates a flowchart of a method for assigning complete frame refreshes throughout the complete cycle according to an embodiment of the present disclosure. In the example of the 16-view system, four parallel channels (A, B, C and D) are transmitted, and the compulsory complete updating can be spread over the 16.7 ms cycle at 4.2 ms intervals, so as to reduce the data storage requirements as much as possible.

Figure 20:
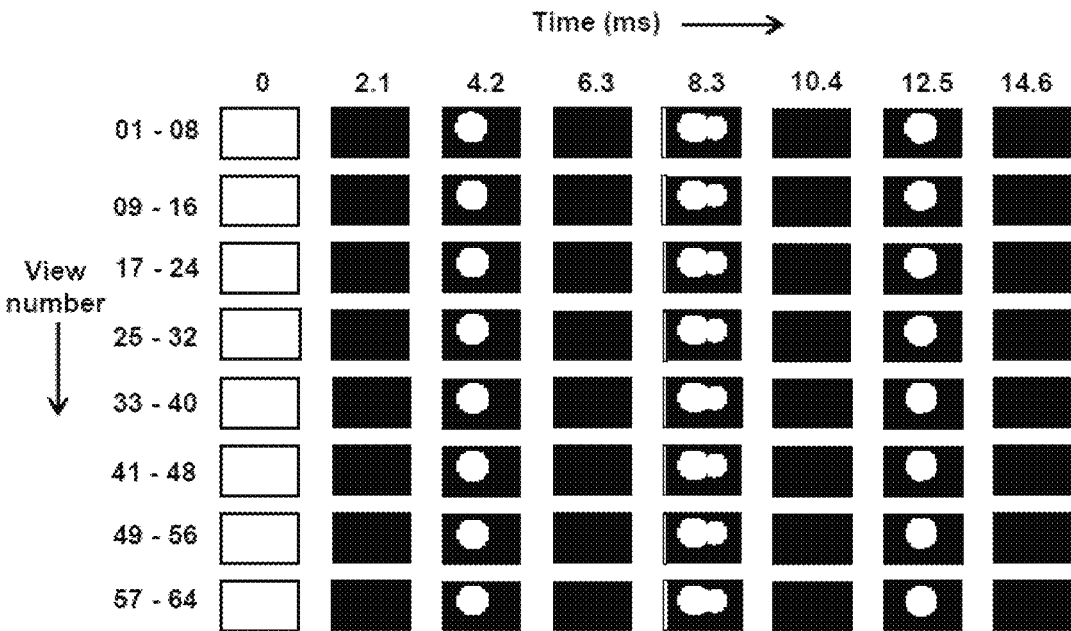
FIG. 20 is a schematic diagram of the effect of the multiview 3D image encoding method according to an embodiment of the present disclosure.
Figure 21:
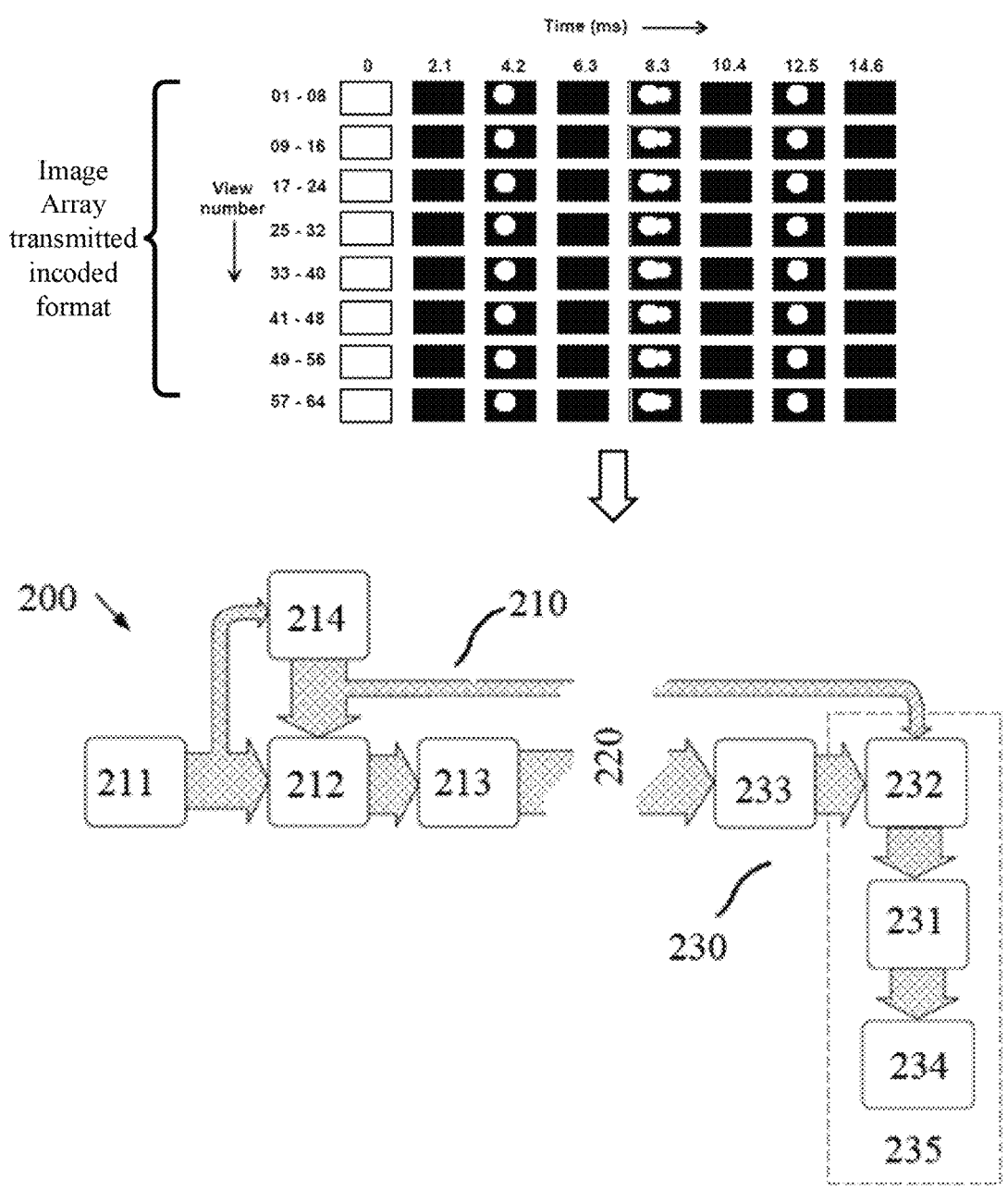
FIG. 21 is a schematic diagram of an overall image of a running 64-view-system according to an embodiment of the present disclosure.

FIG. 20 illustrates a schematic diagram of the effect of the multiview 3D image encoding method according to an embodiment of the present disclosure, where the frames for a 64-view system are shown storing the same images illustrated in FIG. 8. It can be seen that only half the frames are storing any images, however, the imaging device has the capability to display greater depth when required. FIG. 21 incorporates FIG. 20 into the block diagram for the complete system so as to give an overall schematic diagram of a running 64-view system according to an embodiment of the present disclosure.

According to the embodiments of the invention, the jitter problem between adjacent views in image display can be effectively alleviated and the discontinuity of image display can be reduced by capturing image data under multiple views. Furthermore, based on the angular resolution parameter, the captured image data is selectively updated and stored by the multiplexing device. Not only the amount of processing redundant data in the process of data transmission and storage, and the waste of system storage resources and computing resources are reduced, and the system performance is improved.

The device embodiments described above are merely schematic, where the units illustrated as separate components may or may not be physically separated, i.e., may be located in one place or may also be distributed to multiple network units. Some or all of the modules can be selected according to actual needs to achieve the purpose of this embodiment.

It can be understood by those having ordinary skills in the art that all or some of the steps of the methods, systems and functional modules/units in the devices disclosed above can be implemented as software, firmware, hardware, and appropriate combinations thereof.

In the hardware implementation, the division between functional modules/units mentioned in the above description does not necessarily correspond to the division of physical components. For example, one physical component can have multiple functions, or one function or step can be performed by several physical components in cooperation. Some or all of the physical components may be implemented as software executed by a processor, such as a central processing unit, a digital signal processor or a microprocessor, or as hardware, or as an integrated circuit, such as an disclosure specific integrated circuit. Such software can be distributed on computer-readable media, which can include computer storage media (or non-transitory media) and communication media (or transitory media). As well known to those having ordinary skills in the art, the term computer storage medium includes volatile and nonvolatile, removable and non-removable media implemented in any method or technology for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those having ordinary skills in the art that communication media typically contain computer-readable instructions, data structures, program modules or other data in a modulated data signal such as a carrier wave or other transmission mechanism, and can include any information delivery media.

The above is a detailed description of several embodiments of the present disclosure, but the present disclosure is not limited to the above embodiments. Those having ordinary skills in the art can also make various equivalent modifications or replacements without departing from the principles of the present disclosure, and these equivalent modifications or replacements are all included in the scope defined by the appended claims of the present disclosure.

The invention claimed is:

1. A multiview 3D image encoding method, comprising:
acquiring image data of an image, and obtaining depth information containing a depth value of each pixel in the image based on the image data;
grouping the image data into blocks, and calculating a perceived angular resolution of each object in blocks based on the depth information of each object in blocks respectively, wherein the perceived angular resolution of an object in blocks is a required maximum angular resolution that enables identification of the object in blocks; and
configuring a respective encoding parameter for each object in blocks based on the perceived angular resolution of a respective one object in blocks, wherein the encoding parameter is configured such that a requirement of respective encoding parameter for a respective object in blocks with a respective perceived angular resolution.

2. The encoding method according to claim 1, wherein grouping the image data into blocks, and calculating a perceived angular resolution of each object in blocks based on the depth information of each object in blocks respectively comprises:
grouping the image data into blocks by rows;
calculating a maximum depth value of each object in blocks based on a depth value of each pixel in a respective one object in blocks; and
obtaining a maximum angular resolution of each object in blocks as the perceived angular resolution of a respective one object in blocks based on the maximum depth value of the respective one object in blocks.

3. A multiview 3D image encoding apparatus, for carrying out the encoding method of claim 2, wherein the encoding apparatus comprises:
a plurality of capturing devices configured to acquire image data under various views;

a multiplexing device configured to select an output of information in the image data acquired by the plurality of capturing devices based on a perceived angular resolution, so as to meet a requirement of different encoding parameters for different regions of the image data, wherein the perceived angular resolution is obtained based on depth information of the image data; and
a frame buffer device configured to receive the output selected from the plurality of capturing devices by the multiplexing device, and update buffer data based on the selected output;
wherein, the encoding apparatus at least has a first operating mode configured with a first encoding parameter and a second operating mode configured with a second encoding parameter based on the output selected by the multiplexing device.

4. A multiview image encoding apparatus, comprising:
a memory configured to store at least one program; and
a processer configured to execute the program stored in the memory which, when executed by the processor, causes the processor to carry out the encoding method of claim 2.

5. The encoding method according to claim 1, wherein configuring a respective encoding parameter for each object in blocks based on the perceived angular resolution of a respective one object in blocks comprises:
dividing the depth information into at least a first depth value and a second depth value, wherein the first depth value and the second depth value comprise different depth regions, for distinguishing different depth regions where the objects in blocks fall within;
obtaining at least one of a respective first angular resolution or a first refresh rate, and at least one of a respective second angular resolution or a second refresh rate based on at least the first depth value and the second depth value, wherein the first angular resolution and the second angular resolution are respectively required angular resolutions for objects located in the different depth regions with the first depth value and the second depth value respectively, so as to distinguish the objects, and the first refresh rate and the second refresh rate respectively correspond to the respective refresh rates for the objects located in the different depth regions having the first depth value and the second depth value respectively; and
performing a comparison on the perceived angular resolution with the first angular resolution and the second angular resolution, and configuring at least one of a respective angular resolution or refresh rate for each object in blocks in the image based on the comparison.

6. The encoding method according to claim 5, wherein configuring at least one of a respective angular resolution or refresh rate for each object in blocks in the image based on a comparison comprises:
configuring at least one of the first angular resolution or the first refresh rate for each object in blocks at an initial moment;
performing a determination as to whether or not the perceived angular resolution is greater than a currently configured angular resolution for each object in blocks, and
in response to a determination that the perceived angular resolution is greater than the currently configured angular resolution, increasing at least one of a currently configured angular resolution or refresh rate, until the currently configured angular resolution meets a requirement of the perceived angular resolution or reaches the second angular resolution, and then stopping configuring at least one of the angular resolution or the refresh rate.

7. The encoding method according to claim 6, further comprising:

performing a determination as to whether or not the perceived angular resolution of the object in blocks is greater than the second angular resolution, in response to a determination that the perceived angular resolution of the object in blocks is greater than the second angular resolution, calculating the angular resolution of each pixel in the block based on the depth value of each pixel in the block;

performing a further determination as to whether or not the required angular resolution of the pixel is greater than the second angular resolution, and in response to a determination that the required angular resolution of the pixel is greater than the second angular resolution, discarding information of the pixel.

8. A multiview 3D image encoding apparatus, for carrying out the encoding method of claim 1, wherein the encoding apparatus comprises:

a plurality of capturing devices configured to acquire image data under various views;

a multiplexing device configured to select an output of information in the image data acquired by the plurality of capturing devices based on a perceived angular resolution, so as to meet a requirement of different encoding parameters for different regions of the image data, wherein the perceived angular resolution is obtained based on depth information of the image data; and a frame buffer device configured to receive the output selected from the plurality of capturing devices by the multiplexing device, and update buffer data based on the selected output;

wherein, the encoding apparatus at least has a first operating mode configured with a first encoding parameter and a second operating mode configured with a second encoding parameter based on the output selected by the multiplexing device.

9. The encoding apparatus according to claim 8, wherein:

the first encoding parameter at least comprises at least one of a first angular resolution or a first refresh rate; and the second encoding parameter at least comprises at least one of a second angular resolution or a second refresh rate.

10. The encoding apparatus according to claim 9, wherein the plurality of capturing devices are configured with:

a first view group under the first operating mode; and a second view group under the second operating mode;

wherein, the first view group and the second view group are determined based on a number of the plurality of capturing devices and the adopted operating mode, and a grouping result corresponds to the output selected from the plurality of capturing devices by the multiplexing device.

11. The encoding apparatus according to claim 10, wherein the multiplexing device is configured for:

at an initial moment, selecting the output by time division and grouping according to the first view group at the first refresh rate;

performing a determination as to whether or not the perceived angular resolution is greater than a currently configured angular resolution for each object in blocks, and in response to a determination that the perceived angular resolution is greater than the currently configured angular resolution for each object in blocks, performing at least one of the following: improving a currently configured refresh rate of the object in blocks, or changing the view groups of the plurality of capturing devices, until the currently configured angular resolution meets the requirement of the perceived angular resolution or the second angular resolution, and performing at least one of the following: stopping configuring the refresh rate, or selecting the output from the plurality of capturing devices in a currently configured view group by time division and grouping.

12. The encoding apparatus according to claim 11, wherein the frame buffer device is configured for:

at an initial moment, refreshing the buffer data in full at the first refresh rate; and refreshing the buffer data in the currently configured refresh rate of the object in blocks based on the output selected by the multiplexing device.

13. A multiview 3D image encoding system comprising the encoding apparatus, wherein the encoding apparatus comprises a plurality of capturing devices configured to acquire image data under various views; a multiplexing device configured to select an output of information in the image data acquired by the plurality of capturing devices based on a perceived angular resolution, so as to meet a requirement of different encoding parameters for different regions of the image data, wherein the perceived angular resolution is obtained based on depth information of the image data; and a frame buffer device configured to receive the output selected from the plurality of capturing devices by the multiplexing device, and update buffer data based on the selected output; wherein, the encoding apparatus at least has a first operating mode configured with a first encoding parameter and a second operating mode configured with a second encoding parameter based on the output selected by the multiplexing device, the system further comprising:

a transmitting apparatus configured to transmit a-coded image data from the encoding apparatus;

a receiving apparatus comprising a frame buffer device configured to receive the coded image data from the encoding apparatus and update the buffer data, and a de-multiplexing device configured to receive the coded image data stored in the frame buffer device, and obtain a decoded image data by decoding the coded image data, wherein the coded image data is obtained from the encoding apparatus by executing the encoding method of claim 1; and a display apparatus configured to display the decoded image data from the demultiplexing device.

14. A multiview image encoding apparatus, comprising:

a memory configured to store at least one program; and a processer configured to execute the program stored in the memory which, when executed by the processor, causes the processor to carry out the encoding method of claim 1.

15. A non-transitory computer-readable storage medium storing at least one computer program which, when executed by a processor, causes the processor to carry out encoding method of claim 1.

16. The non-transitory computer-readable storage medium according to claim 15, wherein grouping the image data into blocks, and calculating a perceived angular resolution of each object in blocks based on the depth information of each object in blocks respectively comprises:

grouping the image data into blocks by rows;

calculating a maximum depth value of each object in blocks based on a depth value of each pixel in a respective one object in blocks; and obtaining a maximum angular resolution of each object in blocks as the perceived angular resolution of a respective one object in blocks based on the maximum depth value of the respective one object in blocks.

17. The non-transitory computer-readable storage medium according to claim 15, wherein configuring a respective encoding parameter for each object in blocks based on the perceived angular resolution of a respective one object in blocks comprises:

dividing the depth information into at least a first depth value and a second depth value, wherein the first depth value and the second depth value comprise different depth regions, for distinguishing different depth regions where the objects in blocks fall within;

obtaining at least one of a respective first angular resolution or a first refresh rate, and at least one of a respective second angular resolution or a second refresh rate based on at least the first depth value and the second depth value, wherein the first angular resolution and the second angular resolution are respectively required angular resolutions for objects located in the different depth regions with the first depth value and the second depth value respectively, so as to distinguish the objects, and the first refresh rate and the second refresh rate respectively correspond to the respective refresh rates for the objects located in the different depth regions having the first depth value and the second depth value respectively; and performing a comparison on the perceived angular resolution with the first angular resolution and the second angular resolution, and configuring at least one of a respective angular resolution or refresh rate for each object in blocks in the image based on the comparison.

18. The non-transitory computer-readable storage medium according to claim 17, wherein configuring at least one of a respective angular resolution or refresh rate for each object in blocks in the image based on a comparison comprises:

configuring at least one of the first angular resolution or the first refresh rate for each object in blocks at an initial moment;

performing a determination as to whether or not the perceived angular resolution is greater than a currently configured angular resolution for each object in blocks, and in response to a determination that the perceived angular resolution is greater than the currently configured angular resolution, increasing at least one of a currently configured angular resolution or refresh rate, until the currently configured angular resolution meets a requirement of the perceived angular resolution or reaches the second angular resolution, and then stopping configuring at least one of the angular resolution or the refresh rate.

19. The non-transitory computer-readable storage medium according to claim 18, further comprising:

performing a determination as to whether or not the perceived angular resolution of the object in blocks is greater than the second angular resolution, in response to a determination that the perceived angular resolution of the object in blocks is greater than the second angular resolution, calculating the angular resolution of each pixel in the block based on the depth value of each pixel in the block;

performing a further determination as to whether or not the required angular resolution of the pixel is greater than the second angular resolution, and in response to a determination that the required angular resolution of the pixel is greater than the second angular resolution, discarding information of the pixel.

* * * * *